(12) United States Patent
Van Toor et al.

(10) Patent No.: US 7,498,453 B2
(45) Date of Patent: Mar. 3, 2009

(54) **LOW *TRANS*-FATTY ACID FATS AND FAT COMPOSITIONS AND METHODS OF MAKING SAME**

(75) Inventors: N. Hans Van Toor, Zoetermeer (NL); Gijsbertus Johannes Van Rossum, Hoogvliet (NL); Marco B. Kruidenberg, Oostvoorne (NL)

(73) Assignee: Cargill Incorporated, Wayzata, MN (US)

( * ) Notice: Subject to any disclaimer, the term of this patent is extended or adjusted under 35 U.S.C. 154(b) by 0 days.

(21) Appl. No.: 10/567,726

(22) PCT Filed: Aug. 2, 2004

(86) PCT No.: PCT/US2004/025011

§ 371 (c)(1),
(2), (4) Date: Oct. 31, 2006

(87) PCT Pub. No.: WO2005/011391

PCT Pub. Date: Feb. 10, 2005

(65) Prior Publication Data

US 2007/0185340 A1   Aug. 9, 2007

Related U.S. Application Data

(63) Continuation of application No. 10/750,457, filed on Dec. 31, 2003.

(60) Provisional application No. 60/546,397, filed on Feb. 21, 2004, provisional application No. 60/525,914, filed on Nov. 30, 2003, provisional application No. 60/492,160, filed on Jul. 31, 2003.

(51) Int. Cl.
*C07C 51/36* (2006.01)
(52) U.S. Cl. ...................................................... 554/141
(58) Field of Classification Search ....................... None
See application file for complete search history.

(56) References Cited

U.S. PATENT DOCUMENTS

| | | |
|---|---|---|
| 3,856,710 A | 12/1974 | Moulton et al. |
| 4,088,603 A | 5/1978 | Carter et al. |
| 4,134,905 A | 1/1979 | Hasman |
| 4,184,982 A | 1/1980 | Schroeder et al. |
| 4,188,333 A | 2/1980 | Cahen |
| 4,209,547 A | 6/1980 | Scarpiello et al. |
| 4,213,882 A | 7/1980 | Kranich |

(Continued)

FOREIGN PATENT DOCUMENTS

EP   0 021 528 B1   3/1983

(Continued)

OTHER PUBLICATIONS

Maskaev et al., Khimiya i Tekhnologiya Topliv i Masel, No. 6, pp. 19-20, 1973.*

(Continued)

*Primary Examiner*—Deborah D Carr
(74) *Attorney, Agent, or Firm*—Perkins Coie LLP

(57) ABSTRACT

This disclosure describes select low trans-fatty acid fats and fat compositions and methods of making such fats and fat compositions. These fats and fat compositions achieve properties commonly associated with typical partially hydrogenated fats, but avoid the high trans-fatty acid contents typically associated with such fats.

40 Claims, 3 Drawing Sheets

U.S. PATENT DOCUMENTS

| | | |
|---|---|---|
| 4,228,088 A | 10/1980 | Kuiper |
| 4,229,361 A | 10/1980 | Cahen |
| 4,251,672 A | 2/1981 | Carter |
| 4,260,643 A | 4/1981 | Cochran |
| 4,263,225 A | 4/1981 | Carter |
| 4,278,609 A | 7/1981 | Kuiper |
| 4,307,026 A | 12/1981 | Kuiper |
| 4,317,748 A | 3/1982 | Torok |
| 4,326,932 A | 4/1982 | Froling |
| 4,356,197 A | 10/1982 | Devitt |
| 4,385,001 A | 5/1983 | Rosen |
| 4,399,007 A | 8/1983 | Froling |
| 4,424,162 A | 1/1984 | Rosen |
| 4,424,163 A | 1/1984 | Rosen |
| 4,430,350 A | 2/1984 | Tresser |
| 4,479,902 A | 10/1984 | Rosen |
| 4,510,091 A | 4/1985 | Rosen |
| 4,510,092 A | 4/1985 | Rosen |
| 4,519,951 A | 5/1985 | Qualeatti |
| 4,547,319 A | 10/1985 | Qualeatti |
| 4,584,139 A | 4/1986 | Gray |
| 4,590,007 A | 5/1986 | Tucker |
| 4,626,604 A | 12/1986 | Hiles et al. |
| 4,666,635 A | 5/1987 | Klimmek |
| 4,670,416 A | 6/1987 | Klimmek |
| 4,696,911 A * | 9/1987 | Boerma et al. ............... 554/147 |
| 4,725,573 A | 2/1988 | Mesters |
| 4,786,402 A | 11/1988 | Anstock |
| 4,847,016 A | 7/1989 | Gobel |
| 4,871,485 A | 10/1989 | Rivers |
| 4,960,960 A | 10/1990 | Harrison |
| 4,973,430 A | 11/1990 | Rivers |
| 5,087,599 A | 2/1992 | Botman |
| 5,112,792 A | 5/1992 | Lok |
| 5,223,470 A | 6/1993 | Bouwman |
| 5,225,581 A | 7/1993 | Pintauro |
| 5,298,638 A | 3/1994 | Toeneboehn |
| 5,354,877 A | 10/1994 | Behr |
| 5,360,920 A | 11/1994 | Weber |
| 5,399,792 A | 3/1995 | Demmering |
| 5,463,096 A | 10/1995 | Lok |
| 5,470,598 A | 11/1995 | Scavone |
| 5,492,877 A | 2/1996 | Gubitosa |
| 5,498,587 A | 3/1996 | Deckers |
| 5,599,376 A | 2/1997 | Camp |
| 5,674,796 A | 10/1997 | Lee |
| 5,693,835 A | 12/1997 | Konishi |
| 5,734,070 A | 3/1998 | Tacke |
| 5,863,589 A | 1/1999 | Covington |
| 5,885,643 A | 3/1999 | Kodali |
| 5,912,041 A | 6/1999 | Covington |
| 5,962,711 A | 10/1999 | Harrod |
| 5,981,781 A | 11/1999 | Knowlton |
| 6,033,703 A | 3/2000 | Roberts |
| 6,113,976 A | 9/2000 | Chiou |
| 6,129,789 A | 10/2000 | Kawase |
| 6,218,556 B1 | 4/2001 | Pintauro |
| 6,229,032 B1 | 5/2001 | Jacobs |
| 6,265,596 B1 | 7/2001 | Harrod |
| 6,365,558 B2 | 4/2002 | Lal |
| 6,383,992 B1 | 5/2002 | Garmier |
| 6,391,369 B1 | 5/2002 | Kincs |
| 6,420,322 B1 | 7/2002 | Kodali |
| 6,452,029 B1 | 9/2002 | Hillion |
| 6,544,579 B1 | 4/2003 | Landon |
| 2002/0016519 A1 | 2/2002 | Lok |
| 2004/0146626 A1 | 7/2004 | Higgins |
| 2005/0027136 A1 | 2/2005 | Van Toor et al. |
| 2007/0179305 A1 | 8/2007 | Van Toor et al. |

FOREIGN PATENT DOCUMENTS

| | | |
|---|---|---|
| EP | 0 021 527 B1 | 5/1983 |
| EP | 0 114 704 A2 | 8/1984 |
| EP | 0 120 122 A2 | 10/1984 |
| EP | 0 215 563 A2 | 3/1987 |
| EP | 0 230 971 A2 | 8/1987 |
| EP | 0 246 366 A1 | 11/1987 |
| EP | 246366 * | 11/1987 |
| EP | 0 277 230 | 8/1988 |
| EP | 0 291 303 | 11/1988 |
| EP | 0 300 018 A1 | 1/1989 |
| EP | 0 314 044 A2 | 5/1989 |
| EP | 0 389 158 | 9/1990 |
| EP | 0 398 668 | 11/1990 |
| EP | 0 429 995 A2 | 6/1991 |
| EP | 0 472 918 A1 | 3/1992 |
| EP | 0 528 850 A1 | 3/1993 |
| EP | 0 569 110 A1 | 11/1993 |
| EP | 0 572 081 A1 | 12/1993 |
| EP | 0 534 524 A2 | 3/1994 |
| EP | 0 665 287 A2 | 8/1995 |
| EP | 0 674 698 A1 | 10/1995 |
| EP | 0 703 728 B1 | 4/1996 |
| EP | 0 654 074 B1 | 12/1996 |
| EP | 0 745 116 B1 | 12/1996 |
| EP | 0 757 031 A2 | 2/1997 |
| EP | 0 791 041 B1 | 8/1997 |
| EP | 0 921 728 | 6/1999 |
| EP | 0 831 713 B1 | 2/2000 |
| EP | 1 057 887 A1 | 12/2000 |
| EP | 1 154 854 A1 | 11/2001 |
| EP | 0 917 561 B1 | 7/2003 |
| WO | WO-88/00855 A1 | 2/1988 |
| WO | WO-88/05767 | 8/1988 |
| WO | WO-91/17667 A1 | 11/1991 |
| WO | WO-94/03566 A1 | 2/1994 |
| WO | WO-94/11472 A1 | 5/1994 |
| WO | WO-94/15478 A1 | 7/1994 |
| WO | WO-95/00035 A1 | 1/1995 |
| WO | WO-95/00036 A1 | 1/1995 |
| WO | WO-95/22591 | 8/1995 |
| WO | WO-96/01304 A1 | 1/1996 |
| WO | WO-97/43907 A1 | 11/1997 |
| WO | WO-98/54275 A2 | 12/1998 |
| WO | WO-00/47320 A1 | 8/2000 |
| WO | WO-02/00815 A2 | 1/2002 |
| WO | WO-03/059505 A1 | 7/2003 |
| WO | WO-03/353152 A2 | 7/2003 |
| WO | WO-03/080779 A1 | 10/2003 |
| WO | WO 2004/068960 A1 | 8/2004 |
| WO | WO-2004/068960 A1 | 8/2004 |

OTHER PUBLICATIONS

"PRICAT Catalysts for the Hydrogenation of Edfible Oils," http://www.synetix.com/edibleoils/applications-edibleoils.htm, 2 pages Jul. 25, 2003.

Anderson, J.A., et al., "Influence of the Support in the Selectivity of NI Clay Catalysts for Vegetable Oil Hydrogenation," Amer Chemical Soc.,: 2485-2490 Oct. 1993.

Andrade, G.M.S., et al., "A Statistical Evaluation of the Effects of Process Variables During Catalytic Hydrogenation of Passion Fruit (*Passiflora edulis*) Seed Oil," Braz. J. Chem. Eng., vol. 15, No. 1, ISSN 0104-6632, 12 pages, Mar. 1998.

Balakos, M.W., et al., "Catalyst characteristics and performance in edible oil hydrogenation," Catalysis Today 35 (4): 415-425 Apr. 11, 1997.

Bayer, E., et al., "Selective Hydrogenation of Oleic Acid-Rich Oils in Aqueous-Medium by a PVP-NI-Catalyst," Fett Wissenchaft Technologie-Fat Science Technology, Mar. 1992, pp. 79-82, 94 (3), Konradin Industrieverlag GMBH, Germany.

Behr, A., "Selective Hydrogenation of Multi-Unsaturated Fatty-Acids in the Liquid-Phase," Fett Wissenchaft Technologie-Fat Science Technology, Jan. 1993, pp. 2-11, 95(1), Konradin Industrieverlag GMBH, Germany.

Bernas, A., et al., "Influence of Hydrogen Preactivation on the Linoleic Acid Isomerization Properties of Supported Ruthenium Catalyst," 2003, pp. 3-10, vol. 78, No. 1, Budapest.

Bhering, D, et al., "Preparation of High Loading Silica-Supported Nickel Catalyst: Analysis of the Reduction Step," Applied Catalysis A: General, 2002, pp. 55-64, 234 (1).

Brehm, A., et al., "Use of Platinum-Loaded Y-Zeolites as Catalysts for Hydrogenation of Liquid and Low-Melting Fats," Chemie Ingenieur Technik, Dec. 1989, pp. 963-964, vol. 61 (12).

Choo, H.P., et al., "Activity and selectivity of noble metal colloids for the hydrogenation of polyunsaturated soybean oil," J Mol Catal A-Chem 191 (1): 113-121 Jan. 2, 2003.

Choo, H.P., et al., "Hydrogenation of palm olein catalyzed by polymer stabilized Pt colloids," Journal of Molecular Catalysis A: Chemical 165: 127-134 2001.

Chung, C.S. et al., "Catalyst Preparation and Support Effects for Triglyceride Hydrogenation over Supported Nickel," J Chem. Tech. Biotechnol, 1987, pp. 15-30, vol. 38, Great Britain.

Drozdowski, B., et al., "Effect of rapeseed oil hydrogenation conditions on trans isomers formation," Eur. J. Lipid Sci. Technol. 102: 642-645 2000.

Ferreras, J.F., et al., "Influence of the Clay and the Nickel Content in Catalysts for Vegetable Oil Hydrogenation," React. Kinet. Catal. Lett., vol. 53, No. 1: 1-6 1994.

Fillion, B. et al. "Gas-liquid mass-transfer and hydrodynamic parameters in a soybean oil hydrogenation process under industrial conditions," Ind Eng Chem Res 39 (7): 2157-2168 Jul. 2000.

Fillion, B., et al., "Kinetics, Gas-Liquid Mass Transfer, and Modeling of the Soybean Oil Hydrogenation Process," Ind. Eng. Chem. Res.: 697-709 2002.

Furlong, K., "The Low Trans Challenge", Oils and Fats International, Jul. 2004, pp. 30-31.

Gonzales-Marcos, M.P., et al., "Nickel on Silica Systems. Surface Features and Their Relationship with Support, Preparation Procedure and Nickel Content," Appl Catal A-Gen 162 (1-2): 269-280 Nov. 18, 1997.

Gonzalez-Marcos, M.P., et al., Effect of Thermal Treatments on Surface Chemical Distribution and Catalyst Activity in Nickel on Silica Systems, J Mol Catal A-Chem 120 (1-3): 185-196, Jun. 13, 1997.

Gonzalez-Marcos, M.P., et al., "Control of the Product Distribution in the Hydrogenation of Vegetable Oils over Nickel on Silica Catalysts," The Canadian Journal of Chemical Engineering, vol. 76: 927-935 Oct. 1998.

Grau, R. J., et al., "The Cup-and-Cap Reactor: A Device To Eliminate Induction Times in Mechanically Agitated Slurry Reactors Operated with Fine Catalyst Particles," Ing. Eng. Chem. Res., vol. 26, No. 1, 18-22, 1987.

Herrero, J., et al., "Catalytic Behaviour of Rhodium Supported on Palygorskite, Silica and Titania in Oil Hydrogenation," Applied Catalysis A: General, 86: 37-43, 1992.

Hsu, N, et al., "Catalytic Behavior of Palladium in the Hydrogenation of Edible Oils," J Am Oil Chem Soc, 65 (3): 349-356, Mar. 1988.

Ilinitch, O.M., "Nanosize Palladium Loaded Catalytic Membrane: Preparation and Cis-Trans Selectivity in Hydrogenation of Sunflower Oil," Stud Surf Sci Catal 118: 55-61 1998.

Jart, A., "The magnetic field as an additional selectivity parameter in fat hydrogenation." J Am Oil Chem Soc 74 (5): 615-617 May 1997.

Jovanovic, D., et al., "Nickel hydrogenation catalyst for tallow hydrogenation and for the selective hydrogenation of sunflower seed oil and soybean oil," Catal Today 43 (1-2): 21-28 Aug. 13, 1998.

Jovanovic, D., et al., "The influence of the isomerization reactions on the soybean oil hydrogenation process," J Mol Catal A-Chem 159 (2): 353-357, 2000.

Ju, J.W., et al., "Effects of alcohol type and amounts on conjugated linoleic acid formation during catalytic transfer hydrogenation of soybean oil," J Food Sci 68 (6): 1915-1922 Aug. 2003.

Ju, J.W., et al., "Formation of conjugated linoleic acids in soybean oil during hydrogenation with a nickel catalyst as affected by sulfur addition," J Agr Food Chem 51 (10): 3144-3149. May 7, 2003.

Jung, M.O., et al., "CLA Formation in Oils During Hydrogenation Process as Affected by Catalyst Types, Catalyst Contents, Hydrogen Pressure, and Oil Species," JOACS, vol. 79, No. 5: 501-510 2002.

Jung, M.O., et al., "Effects of Temperature and Agitation Rate on the Formation of Conjugated Linoleic Acids in Soybean Oil during Hydrogenation Process," J. Agric. Food Chem.: 3010-3016 2001.

King, J., et al., "Hydrogenation of Vegetable Oils Using Mixtures of Supercritical Carbon Dioxide and Hydrogen," JOACS, vol. 78 No. 2 107-113 2001.

Kitayama, Y., et al., "Catalytic Hydrogenation of Linoleic Acid over Platinum-Group Metals Supported on Alumina," JAOCS, vol. 74, No. 5: 525-529 1997.

Koseoglu, S.S., et al., "Recent Advances in Canola Oil Hydrogenations," J Am Oil Chem Soc 67 (1): 39-47 Jan. 1990.

List, G.R., et al., "Hydrogenation of Soybean Oil Triglycerides: Effect of Pressure on Selectivity," JAOCS, vol. 77, No. 3: 311-314 2000.

M.B. Macher, A. Holmqvist, "Hydrogenation of palm oil in near-critical and supercritical propane," Eur J Lipid Sci Tech 103 (2): 81-84 Feb. 2001.

Mangnus G., "Hydrogenation of Oils at Reduced TFA Content", Oils and Fats International, Jul. 2004, pp. 33-35.

Mondal, K., et al., "Mediator-assisted electrochemical hydrogenation of soybean oil," Chemical Engineering Science: 2643-2656 2003.

Naglic, M., et al., "Kinetics of Catalytic Transfer Hydrogenation of some Vegetable Oils," JOACS, vol. 75, No. 5: 629-633 1998.

Nele, M., et al., "Preparation of high loading silica supported nickel catalyst: simultaneous analysis of the precipitation and aging steps," Appl Catal A-Gen 178 (2): 177-189 Mar. 22, 1999.

Parry, J.D., et al., "The Hydrogenation of Triglycerides Using Supported Alloy Catalysts. I. Silicia-Supported Ni-Ag Catalysts," J Chem Technol Biot 50 (1): 81-90 1991.

Parry, J.D., et al., "The Hydrogenation of Triglycerides Using Supported Alloy Catalysts. II. Silicia-Supported Pd-Cu Catalysts," J Chem Technol Biot 50 (1): 81-90 1991.

Ravasio, N., et al., "Environmental friendly lubricants through selective hydrogenation of rapeseed oil over supported copper catalysts," Applied Catalysis A: General 233: 1-6 2002.

Santacesaria, E., et al., "Role of mass transfer and kinetics in the hydrogenation of rapeseed oil on a supported palladium catalyst," Applied Catalysts A: General 116: 269-294 1994.

Schoon, N.H., "Is a Low Trans Content Attainable by Conventional Hydrogenation of Vegatable Oils?", Oils-Fats-Lipids, Proceedings of the 21st World Congress of the International Society for Fat Research (ISF), The Hague: 155-158 Oct. 1995.

Simon, P., et al., "A Simplified Horiuti-Polanyi Scheme for the Hydrogenation of Triacylglycerols," JAOCS, vol. 68, No. 2: 74-78 Feb. 1991.

Smidovnik, A., et al., "Catalytic Transfer Hydrogenation of Soybean Oil," JAOCS, vol. 69, No. 5: 405-409 May 1992.

Smidovnik, A., et al., "Kinetics of Catalytic Transfer Hydrogenation of Soybean Oil," JAOCS, vol. 71, No. 5: 507-511 May 1994.

Suh, D.J., et al., "Nickel-alumina composite aerogels as liquid-phase hydrogenation catalysts," J Non-Cryst Solids 285 (1-3): 309-316 Jun. 1, 2001.

Takeya, K. et a., "Hydrogenation of Soybean Oil by Loop Reactor Equiped with Venturi Nozzle," J Jpn Soc Food Sci 42 (4): 237-247 1995.

Takeya, K., et al., "Influence of Nitrogen Gas on Hydrogenation of Corn Oil .2. Novel Method of Edible oil Hydrogenation," J Jpn Soc Food Sci 43 (4): 417-422 1996.

Takeya, K., et al., "Novel Method of Edible Oil Hydrogenation .1. Influence of Inert-Gases on Hydrogenation of Soybean Oil," J Jpn Soc Food Sci 42 (6): 410-418 1995.

Takeya, K., et al., "Soybean oil hydrogenation using hydrogen storage alloy .3. Novel method of edible oil hydrogenation," J Jpn Soc Food Sci 43 (5): 502-509 1996.

Thomson, A., et al., "Silica-Supported Alloy Catalysts for Triglyceride Hydrogenation: The preparation and Properties fo Pd-Ag and Pd-Ni systems," J Chem Technol Biot 37 (4): 257-270 1987.

Veldsink, J., "Selective Hydrogenation of Sunflower Seed Oil in a Three-Phase Catalytic Membrane Reactor," JAOCS, vol. 78, No. 5: 443-446 2001.

Veldsink, J.W., et al., "Heterogeneous hydrogenation of vegetable oils: A literature review." Catal Rev 39 (3): 253-318 1997.

Wang, Y.Q., et al., "A natural seed oil rich in omega6 and omega3 fatty acids," http://www.unl.ac.uk/ibchn/publication/pns01_wang_02.pdf, 1 page.

Warner, K., et al., "Electrochemical Hydrogenation of Edible Oils in a Solid Polymer Electrolyte Reactor. Sensory and Compositional Characteristics of Low Trans Soybean Oils," JAOCS, vol. 77, No. 10 1113-1117 2000.

Weidong, A., et al., "The Electrochemical Hydrogenation of Edible Oils in a Solid Polymer Electrolyte Reactor. I. Reactor Design and Operation," JAOCS, vol. 75, No. 8: 917-925 1998.

Weidong, A., et al., The Electrochemical Hydrogenation of Edible Oils in a Solid Polymer Electrolyte Reactor. II. Hydrogenation Selectivity Studies, JAOCS, vol. 76, No. 2: 215-222 1999.

Wright, A.J., et al., "Cis selectivity of mixed catalyst systems in canola oil hydrogenation," Food Research International: 797-804 2003.

Yusem, G., et al., "Electrocatalytic hydrogenation of soybean oil in a radial flow-through Raney nickel powder reactor," Journal of Applied Electrochemistry: 989-997 1996.

Yusem, G.J., et al., "The Electrocatalytic Hydrogenation of Soybean Oil," JAOCS, vol. 69, No. 5: 399-404 May 1992.

Non-Final Office Action dated Mar. 27, 2006 for U.S. Appl. No. 10/750,457, filed Dec. 31, 2003, entitled "Low Trans-Fatty Acid Fat Compositions; Low-Temperature Hydrogenation, e.g., of Edible Oils", (5 pages).

Non-Final Office Action dated Jan. 5, 2007 for U.S. Appl. No. 10/750,457, filed Dec. 31, 2003, entitled "Low Trans-Fatty Acid Fat Compositions; Low-Temperature Hydrogenation, e.g., of Edible Oils", (8 pages).

Final Office Action dated Oct. 19, 2007 for U.S. Appl. No. 10/750,457, filed Dec. 31, 2003, entitled "Low Trans-Fatty Acid Fat Compositions; Low-Temperature Hydrogenation, e.g., of Edible Oils", (9 pages).

International Search Report and Written Opinion; Jul. 14, 2006; International Application No. PCT/US04/025011 (7 pages).

International Search Report and Written Opinion; Aug. 1, 2006; International Application No. PCT/US04/024955 (5 pages).

Maskaev et al., "Selection of Catalyst for Commercial Production of 12-Hydroxystearic Acid-A Saponifiable Base for Greases", Khimiya I Tekhnologiya Topliv I Masel, No. 6, pp. 19-20, 1973.

* cited by examiner

LOW TRANS-FATTY ACID FATS AND FAT COMPOSITIONS AND METHODS OF MAKING SAME

CROSS REFERENCE TO RELATED APPLICATIONS

This is a U.S. national phase application of International Application No. PCT/2004/025011 filed Aug. 2, 2004, and a continuation of U.S. application Ser. No. 10/750,457, entitled "Low Trans-Fatty Acid Fat Compositions; Low-Temperature Hydrogenation, e.g., of Edible Oils" and filed 31 Dec. 2003, and claims the benefit of U.S. Provisional Application Nos. 60/546,397, filed 21 Feb. 2004; 60/525,914, filed 30 Nov. 2003; and 60/492,160, filed 31 Jul. 2003. The teachings of each of these applications are incorporated herein by reference.

TECHNICAL FIELD

The present invention relates generally to hydrogenation processes and fat compositions. The methods and compositions described below have particular utility in connection with hydrogenation of edible oils to form low trans-fatty acid fats that may be used in or as margarine, shortening, or frying fat, for example.

BACKGROUND

A variety of relatively "hard" fat compositions, e.g., margarine, spreads, shortening, and frying fat, are formed from seed oils and vegetable oils. For example, plastic fat compositions such as margarine and low-fat spreads typically comprise an emulsion of an oil phase (typically including a liquid oil and a hard fat, which usually has been hardened) with an aqueous phase, together with various emulsifiers, stabilizers, preservatives, and flavoring agents.

Most seed oils and vegetable oils, such as soybean oil, rapeseed oil, corn oil, sunflower oil, palm oil, or linseed oil, contain a variety of saturated and unsaturated fatty acids. The fatty acid profiles of oils commonly vary by source, but typically include a variety of saturated fatty acids, such as palmitic acid (C16:0) and stearic acid (C18:0); some monounsaturated fatty acids such as oleic acid (C18:1) and erucic acid (C22:1); and polyunsaturated fatty acids including linoleic acid (C18:2) and linolenic acid (C18:3). (The Cx:y designation refers to fatty acids wherein x is the number of carbon atoms and y is the number of double bonds.)

Polyunsaturated fatty acids, particularly linolenic acid (C18:3), are known to oxidize over time with oxidation proceeding more quickly at higher temperatures such as those used in baking, frying, etc. This oxidation leads to unacceptable rancid flavors. Hence, high contents of linolenic acid can also render edible fats unstable and easily oxidized during cooking and storage, which compromises the sensory characteristics of foods cooked in or incorporating such fats. Many edible fats are hydrogenated to increase stability by reducing the amount of linolenic acid and increasing saturated and monounsaturated fatty acids. For example, the maximum desirable linolenic acid content for many commercial bakery and frying shortenings is about two weight percent of the total fatty acid content of the fat.

Hydrogenating (mono)unsaturated fatty acids increases the saturated fatty acid content. Unduly high saturated fatty acid content in one's diet can adversely impact cardiovascular health by raising serum cholesterol levels. As a byproduct of hydrogenation, unsaturated fatty acids can, be converted from their natural cis configuration to their trans isomer form. Recent studies have indicated that trans-fatty acids may impact cardiovascular health more negatively than saturated fatty acids do. In part due to this recent research, consumers are becoming attentive to the trans-fatty acid content of their diets and many consumers are beginning to prefer products with lower trans-fatty acid content.

DETAILED DESCRIPTION

A. Overview

Figure 1:
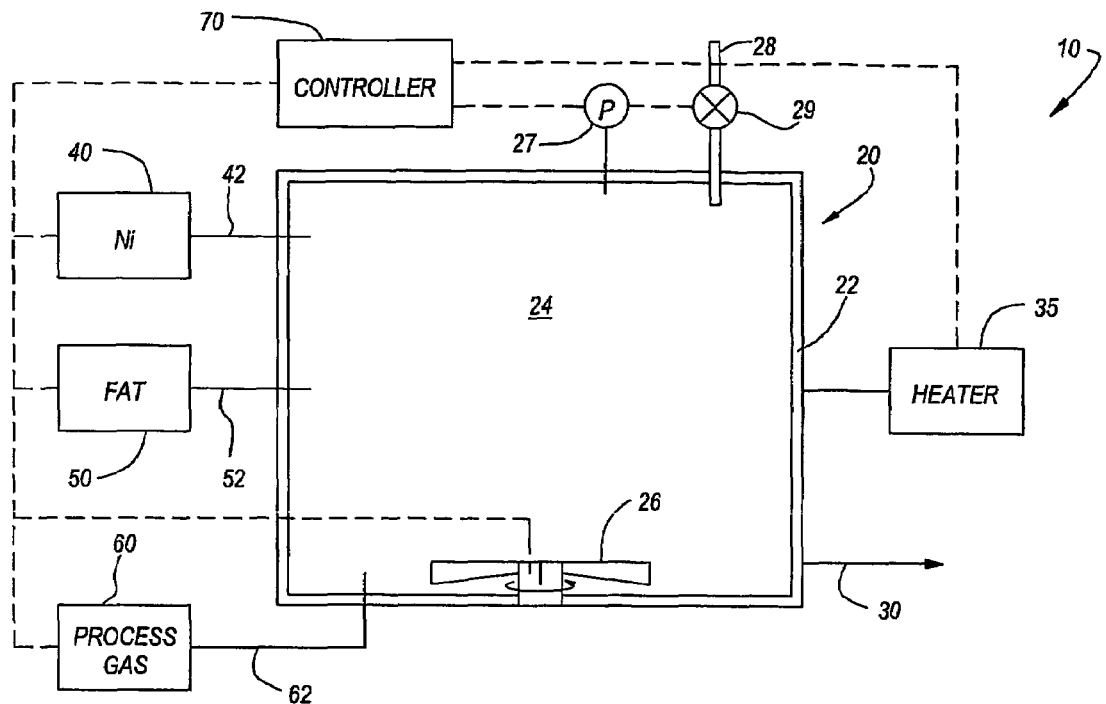
FIG. 1 is a schematic illustration of a catalyst preparation system in accordance with one embodiment of the invention.

Various embodiments of the present invention provide methods for hydrogenating an unsaturated fat, e.g., an edible oil, and edible hydrogenated fat compositions. The following text discusses aspects of the invention in connection with FIGS. 1-4 to provide a thorough understanding of particular embodiments. A person skilled in the art will understand, however, that the invention may have additional embodiments, or that the invention may be practiced without several of the details of the embodiments shown in FIGS. 1 and 2.

One embodiment of the invention provides a method for hydrogenating an unsaturated fat. In accordance with this method a nickel-based catalyst is dispersed in an unsaturated edible oil. The edible oil has an initial Iodine Value and an initial fatty acid profile. Hydrogen is delivered to the oil and the oil is hydrogenated at a hydrogenation temperature for a hydrogenation time to yield a partially hydrogenated fat having a modified Iodine Value and including a modified fatty acid profile. The hydrogenation temperature is no greater than about 80° C., generally preferably about 70° C. or less. The partially hydrogenated fat has a solid fat content of about 20-80 weight percent at 20° C. An absolute difference between the initial Iodine Value and the modified Iodine Value divided by the hydrogenation time defines an average Iodine Value change rate of no less than about 5/hour. No more than about 20 weight percent, e.g., no more than about 15 weight percent, of the modified fatty acid profile comprises trans-fatty acids.

Another embodiment of the invention provides a method of hydrogenating an edible oil having an initial solid fat content of less than about 20 weight percent at 20° C., an initial Iodine Value, and an initial fatty acid profile. This method includes providing a catalyst composition including a fat component and a nickel-based catalyst that has been heated to a first temperature. The catalyst composition is dispersed in the oil and hydrogen is delivered to the oil. The oil is hydrogenated at a second temperature to yield a partially hydrogenated fat having a modified Iodine Value and including a modified fatty acid profile. The second temperature is less than the first temperature. The partially hydrogenated fat has a solid fat content of about 20-80 weight percent at 20° C. An absolute difference between the initial Iodine Value and the modified Iodine Value (dIV, discussed below) divided by the hydrogenation time defines an average Iodine Value change rate of about 6-40/hour. No more than about 20 weight percent, e.g., 15 weight percent or less, of the modified fatty acid profile comprises trans-fatty acids.

A partially hydrogenated fat in accordance with still another embodiment of the invention is selected from a group consisting of partially hydrogenated soy bean oil and partially hydrogenated rapeseed oil. The partially hydrogenated fat has a solid fat content of at least about 20 weight percent at 20° C., a trans-fatty acid content of about 4-20 weight percent, e.g., 15 weight percent or less, and a ratio of C18 content to the trans-fatty acid content (C18:TFA) of at least about one.

Still another embodiment of the invention provides a partially hydrogenated fat, which may be selected from a group consisting of partially hydrogenated soy bean oil and partially hydrogenated rapeseed oil, that includes a solid fat content of at least about 20 weight percent at 20° C.; a trans-fatty acid content of about 4-20 weight percent, e.g., 15 weight percent or less; and a ratio of the solid fat content at 20° C. to the trans-fatty acid content (SFC 20: TFA) of at least about two.

The terms "oil" and "fat" as used herein may be considered interchangeable. While a fat usually refers to an oil in a substantially solid form, at a particular temperature such a solid fat will become an oil when heated to a particular temperature. In the same way substantially all oils will solidify when cooled to a low enough temperature. Therefore, in the context of this specification the terms will be used in a manner to reflect the prevalent state of the material being described. Unless the context dictates a contrary conclusion; however, this reference to the prevalent state should not be construed as a limitation because a change in temperature or substitution of an oil for a fat or a fat for an oil is always possible.

The term "nickel catalyst" as used herein in refers to a nickel compound or mixture of nickel compounds that can function as a catalyst in the present invention. Such nickel catalysts include but are not limited to Ni and NiO. The nickel catalyst may comprise any one or more nickel containing compounds in proportion. Typically, at least some of the nickel will be present as NiO. In some embodiments, substantially all, or even 100%, of the nickel is present as NiO, as in the case of nickel catalysts that have been calcined in air. In other embodiments, about 30-60% of the weight of the nickel is nickel metal and the balance of the weight of the nickel is contained in NiO.

The term "nickel-based catalyst" as used herein refers to a nickel catalyst alone or a nickel catalyst that has been additionally combined with a support material and/or carrying agent. In one embodiment, the nickel-based catalyst comprises nickel carried on an inert support, e.g., alumina or silica. The nickel may comprise about 10-100 weight percent, e.g., about 50-90 weight percent, of the nickel-based catalyst.

In some embodiments, substantially all of the metal carried on the inert support may comprise nickel. In other embodiments, minor amounts of copper or other metals may be added to control activity, selectivity, or other properties of the catalyst. In select implementations, the nickel-based catalyst may be at least substantially free of platinum, palladium, or ruthenium. Nickel catalysts on inert supports expected to suffice for this purpose are commercially available from Degussa AG of Frankfurt, Germany, among others. In addition, nickel-based catalysts often are stored in a carrier material such as an oil or fat for convenience but also to avoid fouling of the catalyst during storage. The presence or absence of such a carrier, while not critical to the present invention, may be taken into account during the processes of the present invention, as discussed below.

The term "catalyst composition" as used herein refers to a nickel-based catalyst which has been prepared by the present invention and includes a protective non-gas medium. The nature of the protective non-gas medium may be varied depending on the nature of the feedstock to be hydrogenated and other process factors. In some preferred embodiments, this protective non-gas medium comprises an additional oil or fat component. For this reason, the invention is described below in the context of using an oil or fat component as the protective non-gas medium. It should be understood, though, that not all embodiments of the invention are so-limited.

For ease of understanding, the following discussion is subdivided into four areas of emphasis. Section B discusses aspects of processes for activating hydrogenation catalysts and exemplary catalyst compositions in accordance with selected embodiments of the invention. Section C outlines hydrogenation methods in accordance with other aspects of the invention. Section D describes edible fats in accordance with other embodiments of the invention, and Section E discusses fat compositions that may be made with the fats of Section D (among others).

B. Catalyst Preparation and Catalyst Compositions

FIG. 1 schematically illustrates one possible catalyst preparation system 10 useful for forming a catalyst composition in some embodiments of the invention. The catalyst preparation system 10 includes a catalyst preparation vessel 20 having walls 22 defining an interior 24. A nickel-based catalyst may be delivered to the vessel interior 24 from a catalyst supply 40 via a catalyst delivery line 42. A fat component may be delivered to the vessel interior 24 from a fat supply 50 via a delivery line 52. A process gas, e.g., hydrogen gas, may be delivered to the vessel interior 24 from a process gas supply 60 via a process gas delivery line 62.

An agitator 26 in the vessel interior 24 may enhance distribution of process gas and the nickel-based catalyst throughout the fat component during the preparation process. The agitator 26 is schematically illustrated as a rotating set of paddles or blades, but those skilled in the art will recognize that any of a variety of systems may be used to distribute the process gas and the nickel-based catalyst throughout the fat component.

The catalyst preparation system 10 may also include temperature probe 34 and a heater 35 operatively coupled to the catalyst preparation vessel 20 to control the temperature of the material in the vessel interior 24. The same heater 35 or separate heaters (not shown) may also be coupled to one or more of the catalyst supply 40, fat supply 50, and process gas supply 60. The catalyst preparation vessel 20 may also include a pressure control 27 adapted to monitor the pressure within the vessel interior 24 and control a vent valve 29 in a vent line 28 adapted to release excess process gas and other gases (e.g., water vapor generated during the preparation process) from the vessel 20. A vessel outlet 30 may be used to remove the catalyst from the vessel interior 24. As noted below, the outlet 30 may communicate directly with a catalyst composition supply 140 in the hydrogenation system 100 of FIG. 2 (discussed below) or send the catalyst to a storage vessel (not shown) for later use.

The catalyst preparation system 10 also includes a controller 70 adapted to control aspects of the catalyst reaction system 10. The controller 70 may be operatively coupled to one or more of the agitator 26, pressure control 27, vent valve 29, heater 35, catalyst supply 40 or delivery line 42, fat supply 50 or delivery line 52, or process gas supply 60 or delivery line 62. In one embodiment, the controller 70 comprises at least one computer having a programmable processor programmed to control operation of these components to form a catalyst composition.

The nickel-based catalyst in the catalyst supply 40 may comprise any of a variety of conventional nickel-based catalysts. In one embodiment, the nickel-based catalyst comprises nickel carried on an inert support, e.g., alumina or silica. In some of these implementations, nickel may comprise about 25-100 weight percent, e.g., about 50-90 weight percent, of the nickel-based catalyst. Typically, at least some of the nickel will be present as NiO. In some embodiments, substantially all of the nickel is present as NiO, as in the case of nickel catalysts that have been calcined in air. In other embodiments, about 30-60% of the weight of the nickel is nickel metal and the balance of the weight of the nickel is contained in NiO.

In some embodiments, substantially all of the metal carried on the inert support may comprise nickel. In other embodiments, minor amounts of copper or other metals may be added to control activity, selectivity, or other properties of the catalyst. In select implementations, the nickel-based catalyst may be at least substantially free of platinum, palladium, or ruthenium. Nickel catalysts on inert supports expected to suffice for this purpose are commercially available from Degussa AG of Frankfurt, Germany, among others.

The fat component in the fat supply 50 may be any of a variety of fat compositions, e.g., an edible fat. Although the fat in the fat supply 50 may be substantially saturated, many of the embodiments of the invention will employ an unsaturated fat. As noted below, some embodiments of the invention employ catalyst compositions having relatively low melting points. In such embodiments, the melting point of the catalyst composition produced in the catalyst preparation system 10 may depend in large part on the composition of the fat in the fat supply 50.

Figure 2:
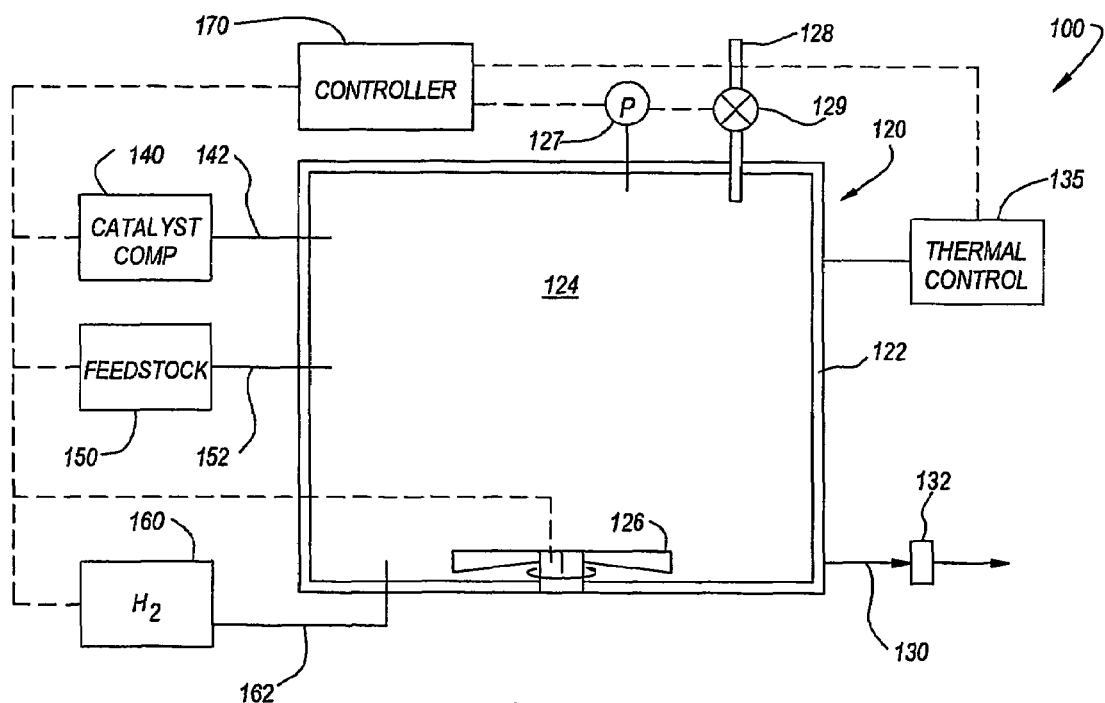
FIG. 2 is a schematic illustration of a hydrogenation system in accordance with another embodiment of the invention.

In some embodiments, the fat in the fat supply 50 comprises seed oil, vegetable oil, marine oil, or an animal fat, or a blend of any two or more of these fats and oils; such fats are collectively referred to herein as "edible fats and oils." Included within the gambit of the identified oils and fats are fractions of those oils or fats, e.g., a fractionated palm oil is considered herein as a vegetable oil. In certain implementations, the term "edible fats and oils" may also encompass synthesized oils or fats that are similar to such oils, e.g., glycerides such as mono-, di-, and triacylglycerides. Catalyst compositions with relatively low melting points may be formed using, for example, coconut oil, tributyrin, or any other short-chain or medium-chain glycerides in the fat supply 50. In other embodiments, the fat selected for the fat supply 50 may be the same type of fat that is to be hydrogenated in the hydrogenation system 100 (FIG. 2, discussed below). Hence, if the catalyst composition produced in the catalyst preparation system 10 is to be used to hydrogenate soybean oil, the fat component in the fat supply 50 may contain or consist essentially of soybean oil. This avoids the contamination that results from using a fat in the catalyst composition different from the oil being hydrogenated with the catalyst composition.

In the embodiment shown in FIG. 1, there is a separate catalyst supply 40 and fat supply 50. In such an embodiment, the nickel-based catalyst in the catalyst supply 40 may comprise both a nickel-based catalyst as described above and a fat, e.g., a fully hardened seed oil or vegetable oil. Such nickel-based catalyst formulations are commercially available from a variety of sources, including products sold by Johnson Matthey Plc of London, UK under the trade name PRICAT. If the catalyst supply 40 includes sufficient fat to form the desired catalyst composition, the separate fat supply 50 may be omitted, essentially combining the catalyst supply 40 and the fat supply 50 into a single supply. In other embodiments, the fat supply 50 may provide a source of additional fat and both the fat-containing catalyst formulation in the catalyst supply 40 and additional fat from the fat supply 50 may be delivered to the catalyst preparation vessel 20.

If so desired, the gas in the process gas supply 60 may be any substantially non-oxidizing gas. The process gas may consist of any inert noble gas or substantially inert gas such as nitrogen. In another possible embodiment the process gas may contain or consist essentially of a reducing gas such as hydrogen or ammonia or mixtures of reducing gases. For example, the process gas supply 60 may include a supply of hydrogen gas and a separately controllable supply of nitrogen, ammonia (not shown), or other nitrogen-containing gas. In select embodiments, the gas may consist essentially of hydrogen or comprise a mixture of two or more of hydrogen gas, nitrogen gas, ammonia, and helium gas.

The catalyst preparation system 10 schematically illustrated in FIG. 1 is a batch-type system. It is contemplated, though, that catalyst preparation systems in accordance with other embodiments of the invention may activate catalyst compositions on a continuous basis.

Some embodiments of the invention provide methods for producing an activated catalyst composition. In the following discussion, reference is made to the catalyst preparation system 10 shown schematically in FIG. 1. It should be understood, though, that reference to this particular system is solely for purposes of illustration and that the preparation methods outlined below are not limited to the particular system shown in FIG. 1 or discussed above.

A method in accordance with one embodiment produces a catalyst composition by contacting a fat component with a nickel-based catalyst in the presence of a process gas at an preparation temperature. The fat component may comprise oil or other fat delivered to the vessel interior 24 from the fat supply 50 via delivery line 52. In one embodiment, the fat may be delivered to the vessel interior 24 and heated to the preparation temperature by the heater 35 in the vessel interior 24 before the nickel-based catalyst is added. In other embodiments, the fat component may be pre-heated before it is delivered to the vessel interior 24 and the heater 35 may simply be used to maintain the reactants in the vessel interior 24 at the desired reaction temperature.

The controller 70 may monitor and control the pressure in the vessel interior 24 via the pressure controller 27. In one embodiment, the pressure in the vessel interior is sub-atmospheric or higher, e.g., 1-25 bar with pressures of at least two bar being useful in some configurations. In some embodiments, the pressure in the vessel interior 24 may vary depending on the state of the process. For example, the pressure in the vessel interior 24 may be maintained below atmospheric pressure for a period of time after the fat is introduced to the vessel interior 24 to outgas air and other dissolved gases in the fat. Alternatively, or in addition to such sub-atmospheric outgassing, the fat may be purged, e.g., with nitrogen, hydrogen, or helium, to remove oxygen from the fat.

The nickel-based catalyst may be delivered to the vessel interior 24 via the catalyst delivery line 42. In one embodiment, the nickel-based catalyst is added to a quantity of fat component in the vessel 20 when the fat component is at the desired preparation temperature. In other embodiments, the nickel-based catalyst may be added prior to reaching that temperature. The agitator 26 may intermix the nickel-based catalyst with the fat component, effectively distributing the nickel-based catalyst within the fat component.

The heater 35 may be used to maintain the temperature of the reactants in the vessel interior 24 at the desired preparation temperature. If the fat in the fat supply 50 is unsaturated, contact with the nickel-based catalyst in the presence of hydrogen, for example, from the process gas supply 60 will cause an exothermic hydrogenation reaction. As a result, the reaction may proceed with no additional heat from the heater 35 and the temperature may climb during this hydrogenation process. The preparation temperature is desirably at least about 85° C. In some embodiments the preparation temperature is at least about 95° C. or at least about 100° C. It is anticipated that the reaction rate may be substantially higher at higher temperatures, which may be at least about 150°, e.g., at least about 200° C. In one exemplary embodiment, the preparation temperature is about 150-200° C. The length of time during which the fat is exposed to hydrogen at the preparation temperature would depend, in part, on the preparation temperature. For example, the preparation process may continue for five minutes or longer, e.g., 5-120 minutes, with longer times typically being employed at lower preparation temperatures.

After heating, the reactants in the vessel interior 24 may be cooled to a lower temperature. For example, the reactants may be cooled to room temperature, e.g., 20-25° C., for storage and future use or, if the reactants are to be directly added to a hydrogenation vessel (124 in FIG. 2), to an intermediate temperature, e.g., 120° C. It appears that cooling these reactants in a reducing atmosphere (e.g., a hydrogen atmosphere) or a nitrogen atmosphere can significantly improve the hydrogenation activity of the catalyst composition. In select embodiments of the invention, the cooling is conducted under a superatmospheric hydrogen pressure, e.g., two bar. It is anticipated that higher hydrogen pressures during cooling may further enhance the hydrogenation activity of the catalyst composition. In one particular embodiment, the reactants are cooled to an intermediate temperature close to room temperature, e.g., 35° C., under a hydrogen atmosphere, then allowed to cool from the intermediate temperature to room temperature in another atmosphere, e.g., air. In one embodiment, the intermediate temperature is less than the melting point of the fat in the catalyst composition.

The preparation process may generate gas, e.g., water vapor. This water vapor can be removed from the vessel 20, e.g., by venting the headspace through vent line 28 or via a condensation system (not shown).

Aspects of select catalyst preparation processes in accordance with the invention are illustrated in the following examples:

Catalyst Preparation Example 1

A first exemplary catalyst composition was formed by adding 40 g of PRICAT 9920 to a round-bottom 250 ml flask. The PRICAT 9920, which is commercially available from Johnson Matthey Plc, is nominally about 22 weight percent total nickel on an alumina support coated with a hardened vegetable fat as a protective medium. The hardened vegetable fat has a melting point (as measured under ISO 6321, "Melting Point in Open Capillary Tubes (Slip Point)") of about 56-69° C. The nickel-based catalyst was heated in the flask at atmospheric pressure with a hydrogen gas flow of approximately one liter per minute to a temperature of about 200° C. while stirring. The contents were stirred at that temperature and hydrogen flow rate for about 90 minutes. The hydrogen pressure was increased to about two bar and the hydrogen flow was stopped. The catalyst composition was cooled to about 20° C., yielding a solid catalyst composition.

Catalyst Preparation Example 2

A second exemplary catalyst composition was formed using substantially the same process as that outlined in Catalyst Preparation Example 1, except that the process was carried out at 95° C. The resulting catalyst composition was cooled to about 20° C., yielding a solid catalyst composition.

Catalyst Composition Preparation Example 3

A third exemplary catalyst composition was formed using substantially the same process as that outlined in Catalyst Preparation Example 1, except that about 40 g of coconut oil was added to the flask with the 40 g sample of PRICAT 9920. The resultant catalyst composition was solid at 20° C. and the fat in the catalyst composition had a melting point of about 50° C.

Catalyst Preparation Example 4

A fourth exemplary catalyst composition was prepared by flowing nitrogen (instead of hydrogen) through a bulk quantity of PRICAT 9920 and neutralized, bleached soybean oil to a pressure of about 2 bar. The temperature was held at about 110° C. for about 120 minutes, with the nitrogen atmosphere in the reaction vessel being maintained by periodically flushing the headspace of the reaction vessel with nitrogen. The final catalyst composition was about 65 weight percent of the PRICAT 9920 nickel-based catalyst, about 22 weight percent soybean oil, and about 13 weight percent PERLITE, a commercially available filter aid.

Once the preparation process is complete, the catalyst composition may be removed from the vessel 20, e.g., via outlet 30. In one embodiment, the catalyst composition may be delivered directly from the vessel 20 to the catalyst composition supply 140 of the hydrogenation system 100, discussed below. In such an embodiment, the catalyst composition may be delivered to the hydrogenation system 100 at an elevated temperature, e.g., at the preparation temperature or, more generally, about 100-200° C. In other embodiments, the catalyst composition may be allowed to cool in a separate system to a lower temperature, e.g., 20-25° C., and stored for an extended period of time. Maintaining a hydrogen atmosphere (or an atmosphere of another reducing gas) during cooling may permit longer storage times without undue loss in activity. Cooling the catalyst composition in a nitrogen or air atmosphere is expected to work well, though.

It has been found, for example, that the low temperature-hydrogenation capabilities of the catalyst composition of some embodiments can be maintained after storage at 20-25° C. for two weeks or longer. It is anticipated that this relatively long shelf life will enable catalyst compositions in accordance with embodiments of the invention to be sold commercially to third parties for use in hydrogenation reactions. Solid catalyst compositions (which may comprise a nickel-based catalyst and a protective solid or at least semi-solid medium) may be stored as a relatively large block or may be divided into smaller particles to facilitate distribution of the catalyst composition in the feedstock to be hydrogenated. Liquid-based catalyst compositions (which may comprise a nickel-based catalyst and a protective liquid or semi-liquid medium) are advantageously stored in a suitable container, e.g., portable drums or jugs.

Other embodiments of the invention provide catalyst compositions. In certain embodiments, the catalyst compositions are prepared in accordance with the preparation processes outlined above. In an embodiment of the invention, the catalyst composition is adapted to hydrogenate an unsaturated fatty acid component of a seed oil or vegetable oil, for example, at a temperature below that conventionally understood to be necessary for commercial hydrogenation. Although the nickel-based catalysts may be comprised substantially of a nickel catalyst, catalyst compositions in accordance with preferred embodiments of the invention include a nickel-based catalyst dispersed in a fat matrix, e.g., a solid or semi-solid fat. For example, the fat matrix may comprise a substantially saturated glyceride, e.g., a hydrogenated fat produced using a long-chain triacylglyceride, seed oil, or vegetable oil as the fat component in the preparation processes outlined above.

The nickel-based catalyst in the catalyst composition is adapted to sustain, in the presence of hydrogen, a hydrogenation reaction of a composition containing polyunsaturated fatty acids at a hydrogenation temperature no greater than about 80° C., e.g., no greater than about 70° C., with 50° C. or less, e.g., 0-50° C., being preferred for many applications. The nickel-based catalyst may be adapted to sustain such hydrogenation at a hydrogenation temperature of about 0-80° C., e.g., about 20-70° C., with some embodiments sustaining hydrogenation at about 30-50° C. and others doing so at about 50-70° C.

The relative proportions of the nickel-based catalyst and the fat component may vary significantly depending on such factors as the nickel content of the nickel-based catalyst and the desired total nickel content of the catalyst composition. In one embodiment, the total nickel content of the catalyst composition is no greater than about 50 weight percent, e.g., 25 weight percent or less, and may advantageously be 22 weight percent of the catalyst composition. (As used herein, the term "total nickel content" refers to the total weight of nickel in the nickel-based catalyst or the catalyst composition. For example, if some of the nickel in the nickel-based catalyst were present as NiO, the total nickel content would include the weight of the nickel in the NiO, as well.) Catalyst compositions having total nickel contents as low as about one weight percent may be employed in some circumstances. Preferably, though, the total nickel content in the catalyst composition is higher than that. Hence, in one embodiment, the total nickel content is about 2-50 weight percent, e.g., between about 2 and about 35 weight percent, with a range of about 2-25 weight percent being useful for many embodiments.

The preceding discussion focuses on catalyst compositions comprising nickel-based catalysts. The industry-proven selectivity of many nickel-based catalysts is believed to be particularly useful in connection with certain types of feedstocks. It is anticipated, though, that the processes outlined above may enhance the catalytic activity of other hydrogenation catalysts. For example, it is anticipated that the catalytic activity of platinum in hydrogenation reactions may be increased using aspects of the process outlined above. This may enable hydrogenation using lower concentrations of the catalyst, at lower temperatures, or at higher rates than may otherwise be achieved.

Catalyst compositions in accordance with embodiments of the invention can be used advantageously in a variety of hydrogenation reactions. For example, catalyst compositions in accordance with aspects of the invention have particular utility in hydrogenation of seed oils and vegetable oils. As explained below, these catalyst compositions can hydrogenate such oils at temperatures lower than conventionally understood to be necessary for hydrogenation at commercially acceptable rates, which can limit formation of trans-fatty acids.

C. Methods for Hydrogenating Edible Oils

Other embodiments of the invention provide systems and methods for hydrogenating unsaturated feedstocks at reduced temperatures. FIG. 2 schematically illustrates a hydrogenation system 100 that may be used in hydrogenating a feedstock in accordance with certain embodiments of the invention. This hydrogenation system 100 includes a hydrogenation vessel 120 including a wall 122 defining a hydrogenation vessel interior 124. A pressure control 127 may be used to monitor pressure within the hydrogenation vessel 120 and control a vent valve 129 in a vent line 128 adapted to release excess hydrogen gas, water vapor, and other gases from the vessel 120. In one embodiment, the vent line 128 may be coupled to a vacuum source 131 to further facilitate pressure control. Alternatively, the vacuum source 131 may communicate with the vessel interior 124 via a separate vacuum line (not shown). An agitator 126, which may be analogous to the agitator 26 of FIG. 1 described above, may be disposed in the hydrogenation vessel interior 124 to mix the reactants within the vessel 120.

The hydrogenated product may be removed from the hydrogenation vessel 120 via an outlet 130. In the catalyst preparation system 10 of FIG. 1, the nickel-based catalyst was intended to remain within the catalyst composition exiting the preparation vessel 20 via the outlet 30. In most intended applications of the hydrogenated product, it may be desirable to remove the nickel-based catalyst from the final hydrogenated product. As is known in the art, a filter 132 may be used to remove the nickel-based catalyst from the hydrogenated product exiting via the outlet 130. In some embodiments, the nickel-based catalyst removed by the filter 132 may be reused, either directly or after further processing. Such further processing may comprise, for example, repeating the preparation process outlined above to reactivate the nickel-based catalyst.

The hydrogenation system 100 also includes a temperature probe 134 and a thermal control 135 that may be operatively coupled to the hydrogenation vessel 120. In one embodiment, the thermal control 135 comprises a heat source, e.g., a radiative or conductive heater. In other embodiments, the thermal control 135 may instead be used to cool the contents of the hydrogenation vessel 120, e.g., to prevent the contents of the hydrogenation vessel 120 from exceeding a maximum desired temperature during the exothermic hydrogenation reaction conducted in the vessel 120.

A controller 170 may be used to control operation of the hydrogenation system 100. The controller 170 may be operatively coupled to one or more of the agitator 126, pressure control 127, vent valve 129, vacuum source 131, thermal control 135, catalyst composition supply 140 (discussed below), feedstock supply 150 (discussed below), and hydrogen supply 160 (also discussed below). The controller 170, like the controller 70 of FIG. 1, may comprise at least one computer having a programmable processor. The programmable processor may be programmed to control operation of the various components of the hydrogenation system 100 to appropriately hydrogenate the feedstock.

A catalyst composition may be delivered from a catalyst composition supply 140 to the hydrogenation vessel interior 124 via a delivery line 142. The catalyst composition in the catalyst composition supply 140 desirably comprises a nickel-based catalyst composition capable of sustaining a hydrogenation reaction at a suitably low hydrogenation temperature. In many embodiments of the invention, the catalyst composition may comprise a catalyst composition such as that described above, including a nickel-based catalyst and a fat.

An unsaturated fat may be delivered to the interior 124 of the hydrogenation vessel 120 via a delivery line 152 from a fat supply 150. A wide variety of unsaturated fats may be employed to yield different hydrogenated products. The hydrogenation system 100 and the catalyst composition in the supply 140 have particular utility in connection with hydrogenating edible oils of all types. The edible oils utilized in some embodiments of the invention are liquid oil from seed, vegetable, marine, or animal sources and include, but are not limited to, soybean oil, rapeseed oil, corn oil, high oleic sunflower oil, linseed oil, cottonseed oil, fish oil, and may included animal fats or other fats. As used herein, the term "rapeseed" is used in a generic sense to encompass the seed also referred to in the Americas as canola, but it should not be limited to any specific variety or varieties of rapeseed. The edible fats and oils also include all traditionally bred or genetically modified varieties of the oils listed above. Other embodiments may utilize semi-solid or solid oils or fats from seed, vegetable, marine, or animal sources and include, but are not limited to, palm oil, coconut oil, cocoa butter, marine fats, tallow, and the like. If so desired, the unsaturated fat feedstock can be a blend of seed fat(s), vegetable fat(s), marine fat(s), and/or animal fat(s). In select embodiments, the feedstock comprises a neutralized, bleached seed or vegetable oil, though some applications may used deodorized oils. In addition, the feedstock need not be triglyceride oil and may instead be a mono- or diglyceride, a fractionated or interesterified fat, or even a free or esterified fatty acid.

The hydrogenation system 100 also includes a hydrogen supply 160 adapted to deliver hydrogen to the reactants in the hydrogenation vessel 120 via a delivery line 162. In one embodiment, the hydrogen supply 160 comprises hydrogen gas, e.g., a commercial hydrogen gas consisting essentially of hydrogen. In other embodiments, the hydrogen supply 160 may include gases other than hydrogen. These other gases may be provided in a separate gas supply (not shown). As in the case of the process gas supply 60 of FIG. 1, discussed above, the hydrogen supply 160 may, for example, include a separate supply of ammonia or other nitrogen-containing compound, which may enhance selectivity of the hydrogenation reaction. If an edible fat composition is to be produced in the hydrogenation system 100, though, it may be advantageous to omit use of ammonia or other nitrogen-containing compounds.

FIG. 2 schematically illustrates a batch-type hydrogenation system 100. In other embodiments of the invention, an alternative hydrogenation system may be employed to hydrogenate the unsaturated fat feedstock on a continuous basis. For example, a nickel-based catalyst may be activated in a fixed or fluidized bed and the unsaturated fat feedstock and hydrogen gas may be passed through this bed of activated catalyst.

Other embodiments of the invention provide methods of hydrogenating an unsaturated fat. The following discussion of such methods refers to the hydrogenation system 100 of FIG. 2. It should be recognized, however, that methods in accordance with the invention may be conducted using any suitable equipment and the invention is not limited to the specific apparatus shown in FIGS. 1 and 2 and discussed above.

In accordance with an embodiment of the invention, an unsaturated fat feedstock is contacted with a nickel-based catalyst in the presence of hydrogen. The relative proportions of the feedstock and the catalyst composition added to the hydrogenation vessel 120 will depend, at least in part, on the nickel content of the catalyst composition. In one embodiment, the total nickel content of the combined catalyst composition and feedstock is no greater than 1 weight percent, e.g., 0.01-1 weight percent. In one embodiment found to work well, the total nickel content is about 0.1-0.3 weight percent of the combined catalyst composition and feedstock. The nickel-based catalyst may be dispersed within the feedstock, e.g., by activating the agitator 126. Although it may be possible to utilize catalysts in addition to the nickel-based catalyst from the catalyst composition, it is anticipated that, in most embodiments, the catalyst composition will be substantially the only catalyst source during the hydrogenation of the feedstock.

As noted above, the catalyst composition may comprise a nickel-based catalyst dispersed in a fat matrix, e.g., a fully saturated fat component. If the catalyst composition is at a temperature below the melting point of the fat matrix, the fat matrix will limit interaction between the nickel-based catalyst and the feedstock in the hydrogenation vessel 120. If the catalyst composition is employed above its melting point, though, the melted fat matrix may be mixed with the bulk of the feedstock, allowing the nickel-based catalyst to intimately mix with the feedstock. Accordingly, in one embodiment of the invention, the fat component of the catalyst composition has a melting point that is no higher than the temperature at which hydrogenation is to be conducted in the hydrogenation vessel 120, e.g., no higher than about 50° C. (This melting point may be determined in accordance with ISO 6321, mentioned above.) In some embodiments, the fat matrix may be liquid or semi-liquid at room temperature. For example, the fat matrix may have a solid fat content (SFC, discussed below) of about 20 weight percent or less at about 20° C.

In other embodiments, the catalyst composition may include a fat component having a melting point higher than the intended hydrogenation temperature. To ensure adequate commingling of the nickel-based catalyst and the feedstock, it is preferable that such a catalyst composition be heated to a temperature at least as great as its melting point. Advantageously, this may be done prior to mixing the catalyst composition with the feedstock. Hence, in one embodiment the catalyst composition may be delivered from the catalyst composition supply 140 to the hydrogenation vessel 120 at a temperature greater than the intended hydrogenation temperature. In such an embodiment, the catalyst composition supply 140 and/or delivery line 142 may include a heater to elevate the temperature of the catalyst composition above the melting point of the fat component. This heated catalyst composition may then be added to a supply of the feedstock in the hydrogenation vessel 120. The feedstock in the hydrogenation vessel 120 may be at a temperature below the intended hydrogenation temperature and the addition of the warmer catalyst composition can elevate the combined temperature to the intended hydrogenation temperature. If further heating is needed to begin the hydrogenation process, the thermal control 135 may heat the contents of the hydrogenation vessel 120.

Alternatively, the catalyst composition may be heated in the hydrogenation vessel 120 to a temperature at least as great as its melting point prior to the addition of the feedstock. In one particular embodiment, the nickel-based catalyst may be activated in the same reaction vessel that is used to carry out the hydrogenation reaction. Hence, in the context of FIGS. 1 and 2, the feedstock supply 150 and the filter 132 may be added to the catalyst preparation system 10 and the feedstock may be added to the catalyst preparation vessel 20 upon completion of the catalyst preparation process. The catalyst composition may be at a temperature substantially higher than the intended hydrogenation temperature, but addition of the feedstock at a temperature below the intended hydrogenation temperature will cool the catalyst composition.

In one embodiment, hydrogen is introduced to the feedstock in the hydrogenation vessel 120 before addition of the catalyst composition. For example, a batch of the feedstock to be hydrogenated may be added to the hydrogenation vessel 120, the pressure control 127 may reduce pressure in the hydrogenation vessel 120 via vent line 128, and a flow of hydrogen from the hydrogen supply 160 may be initiated. This will help to de-aerate the feedstock and create a reducing environment in the reaction vessel before the catalyst composition is added to the reaction vessel. De-aerating and introducing hydrogen in this fashion is anticipated to maintain higher hydrogenation activity in the nickel-based catalyst and limit trans-fatty acid formation. This may also help limit the impact of some impurities in the feedstock, some of which (e.g., sulfur) are expected to have a negative impact on the continued catalytic activity of the nickel-based catalyst over time.

During hydrogenation, the pressure control 127 may be used to control the pressure in the hydrogenation vessel 120. As is known in the art, maintaining superatmospheric pressures in the hydrogenation vessel 120 can increase solubility of the hydrogen in an oil feedstock, facilitating hydrogenation. Appropriate pressures may depend, at least in part, on the nature of the feedstock. When hydrogenating common seed oils or vegetable oils, for example, the pressure in the hydrogenation vessel 120 likely will remain less than 100 bars absolute (bar-a), e.g., 50 bar-a or less. In one embodiment, the pressure in the hydrogenation vessel 120 during hydrogenation is about 1-30 bar-a.

A solvent may be added to reduce viscosity of the feedstock, promoting effective introduction and transport of hydrogen-containing gas. That is not believed to be necessary for hydrogenating most seed oils, vegetable oils, or marine oils, though, and may be disadvantageous when producing an edible fat composition for food applications. In one embodiment, therefore, the feedstock is a seed oil, vegetable oil, or marine oil and the hydrogenation process is conducted substantially solvent-free.

Suitable hydrogenation temperatures will depend in part on the nature of the feedstock being hydrogenated (e.g., melting point) and the nature of the fat composition being produced. In one embodiment, however, the hydrogenation temperature is 70° C., e.g., no greater than about 60° C. Temperatures of 55° C. or less, e.g., no greater than about 50° C., are advantageous for hydrogenating seed oils, vegetable oils, marine oils, or animal oils to produce a food oil with a low trans-fatty acid content. In one embodiment, the hydrogenation temperature is about 0-50° C., preferably about 20-50° C., with a range of 30-50° C. being suitable for many food oils.

As noted above, hydrogenation is an exothermic reaction. In some embodiments, the hydrogenation is initiated and sustained for a time at a hydrogenation temperature in one of the stated temperature ranges, but may increase beyond that range during hydrogenation. For example, the hydrogenation reaction may be initiated at a temperature not greater than about 55° C., e.g., about 50° C. or less, and the temperature may be allowed to increase, e.g., about 10-30° C., during the course of the hydrogenation reaction. If so desired, the hydrogenation temperature is maintained within one of the above-stated temperature ranges (e.g., no greater than about 70° C.) during the entire hydrogenation process. This may be accomplished, for example, by controlling the flow rate of hydrogen from the hydrogen supply 160 or by cooling the vessel with the thermal control 135.

One measure for characterizing an average number of double bonds present in the fatty acids of an oil is the Iodine Value, which is typically determined by the Wijs method (A.O.C.S. Method Cd 1-25). For example, soybean oil typically has an Iodine Value of about 125-135 and rapeseed oil typically has an Iodine Value of about 97-108. Because hydrogenation saturates the double bonds in the triglycerides, a decrease in Iodine Value will serve as a reasonable proxy of a measurement of the degree of hydrogenation. As a corollary, therefore, the rate of change of the Iodine Value for an oil can serve as a proxy for the rate of hydrogenation.

The rate of hydrogenation, and the rate at which the Iodine Value changes, may decrease as the number of double bonds in the oil decreases. An average Iodine Value change rate may be determined by determining the absolute difference between the initial Iodine Value of the oil prior to hydrogenation and the modified Iodine Value of the hydrogenated oil, and dividing that difference by the hydrogenation time. Average Iodine Value change rates of less than about 5/hour correspond to hydrogenation rates that are commercially unacceptable for most conventional edible hydrogenated fats. Accordingly, in embodiments of the invention employed in manufacturing edible fat compositions, for example, the average Iodine Value change rate is desirably no less than about 5/hour. Average Iodine Value change rates of about 6-60/hour are expected to suffice for many commercial hydrogenation processes of edible fats, with average Iodine Value change rates of about 10-40/hour, e.g., about 20/hour, being typical for many embodiments of the invention.

The hydrogenation system. 100 schematically illustrated in FIG. 2 is a batch-type system. It is contemplated, though, that hydrogenation systems in accordance with other embodiments of the invention may hydrogenate fats on a continuous basis.

D. Edible, Partially Hydrogenated Fats

Edible, partially hydrogenated fat compositions in accordance with another embodiment may comprise a partially hydrogenated oil, e.g., a partially hydrogenated seed oil, vegetable oil, or marine oil, and, optionally, an aqueous component. In select embodiments, the fat in these edible fat compositions may be formed by the hydrogenation processes outlined above.

One of the purposes of hydrogenating an oil is to improve its stability, e.g., in air. Reducing the C18:3 content of oils that include C18:3, e.g., soybean oil or rapeseed oil, can significantly improve stability of fats and fat compositions made with the oil. Some other oils, e.g., sunflower oil, have relatively little C18:3, but may include C18:2, another polyunsaturated fatty acid. A number of industry-accepted tests determine the oxidative stability of a fat by measuring the "induction period" on a RANCIMAT, sold commercially by Metrohm Ltd. of Herisau, Switzerland. One exemplary RANCIMAT test is ISO/DIS 6886.2. Refined soybean and sunflower oils typically have induction periods at 120° C. (referred to below as "R 120") on the order of about 3 hours, with refined rapeseed oil having a somewhat longer induction time of about 4 hours at the same temperature. Hydrogenating an oil in accordance with embodiments of the invention may significantly increase the induction period of the hydrogenated fat composition. In some embodiments of the invention, for example, the hydrogenation process desirably increases the induction period at least four-fold. In select examples, the induction period at 120° C. is about 20-75 hours or more, which is as much as twenty-five times the standard 3-4 hour induction times for soybean, rapeseed, and sunflower oils, for example.

Conventional wisdom dictates that seed oils or vegetable oils such as soybean or rapeseed oils must be hydrogenated at temperatures of 100° C. or higher to achieve commercially acceptable hydrogenation. Conventional wisdom also suggests that the lowest temperature at which a nickel-based catalyst will initiate hydrogenation is about 80° C. and that hydrogenation at 80° C. will take place at a commercially unattractive rate. As noted above, though, hydrogenating seed oils or vegetable oils at temperatures of 100° C. or greater will increase the trans-fatty acid content in a resultant fat to relatively high levels, typically greater than 25 weight percent of the fatty acid, with 30-45 weight percent being commonplace for partially hydrogenated fats used as a major component of margarine or shortening.

Trans-fatty acid (TFA) content as used herein is based upon the typical analytical methodology for analyzing the fatty acid profile of fats and oils. TFA content is presented as a weight percentage of trans-fatty acids relative to the overall content of fatty acids in the fat's fatty acid profile. Therefore, if a sample contains only 20 weight percent oil but half of the fatty acids in the oil existed in the trans-configuration, the TFA content would be represented herein as 50 weight percent.

Increasingly, health-conscious consumers are looking for fat compositions with lower trans content and some industry standards are expected to require trans-fatty acid contents for margarine fats of no greater than about 5 weight percent and no greater than about 15 weight percent for shortening. The processes of some embodiments of the invention permit manufacture of partially hydrogenated edible fats having a TFA content of less than about 20 weight percent, preferably less than about 15 weight percent. In other embodiments, the TFA content is between about 4 and about 20 weight percent, with a range of about 5-10 weight percent being desirable for many embodiments.

Hydrogenating seed oils or vegetable oils with a catalyst composition in accordance with select embodiments of the invention yields partially hydrogenated fats with reduced trans-fatty acid levels. In one embodiment, the unsaturated fat feedstock comprises an oil in which 6 weight percent or more of the fatty acid profile is C18:3. For example, soybean oils typically have C18:3 contents on the order of about 7 weight percent, and rapeseed oils often have C18:3 contents of 9 weight percent or higher. Hydrogenating such a feedstock with a catalyst composition at a reduced hydrogenation temperature in accordance with an embodiment of the invention, e.g., 50° C. or less, can yield a hydrogenated fat that has a solid fat content (explained below) of about 20-80 weight percent at typical storage temperatures of about 20° C. in which no more than about one weight percent (preferably no more than about 0.1 weight percent) of the fatty acid profile is C18:3 and no more than about 20 weight percent (preferably no more than about 15 weight percent) of the fatty acid profile is trans-fatty acids.

Solid fat content will affect many aspects of a fat or a fat composition made therewith. For example, the solid fat content at anticipated use and storage temperatures, e.g., about 10-20° C., can affect physical properties and/or stability of a product. At higher temperatures, e.g., 30°-40° C., the solid fat content can affect organoleptic properties such as mouth feel. One known measurement of solid fat content at a particular temperature, method NEN-EN-ISO 8292, employs nuclear magnetic resonance to measure the solid fat content of the fat at a particular temperature. A fat in one exemplary embodiment is no less solid than semi-solid at 25° C., has a solid fat content measured at 20° C. (SFC 20) of no less than about 20 weight percent, and has a solid fat content measured at 30° C. (SFC 30) of no greater than about 50 weight percent. Another embodiment provides a fat that is a pumpable solid at 25° C., has a SFC 20 of no less than about 25 weight percent, and has a SFC 30 of no greater than about 15 weight percent.

Some commercially available margarines and shortenings employ fats having a trans-fatty acid content of less than 15 weight percent, with some having a trans-fatty acid content of two weight percent or less. These products are typically formed by blending and/or interesterification of a fully hydrogenated oil with an unhydrogenated oil. For example, U.S. Pat. No. 5,407,695 (the entirety of which is incorporated herein by reference) proposes blending a substantially fully hydrogenated oil, i.e., an oil in which all of the fatty acids have been substantially fully saturated, with an unhydrogenated oil, e.g., in a 50/50 blend. European Patent Specification EP 0 792 107 B1 (the entirety of which is incorporated herein by reference) suggests a fat blend for margarines that is made by fully hydrogenating a quantity of an oil, e.g., soybean oil, and interesterifying that with an unhydrogenated oil, which may be the same type of oil, e.g., unhydrogenated soybean oil. In both of these approaches, the fully hydrogenated product will not include double bonds, so it will not include any trans isomers. Hence, the only trans-fatty acid content in such a blend typically would come from the unhydrogenated oil.

Although fully hydrogenated+liquid ("FH+L") blends (namely, blends in which at least one of the blended and/or interesterified fats is fully hydrogenated and at least one of the blended and/or interesterified fats is at least pumpable) can have relatively low C18:3 and trans-fatty acid content, there are some drawbacks. For example, FH+L blends tend to have relatively low stability at elevated temperatures, e.g., at baking temperatures. Whereas a shortening made using conventional partially hydrogenated soybean oil may have a R 120 induction period of about 50 hours, some blended shortenings have R 120 induction periods of less than 20 hours, e.g., 10 hours. Initial review suggests that a FH+L blend employing about 60 weight percent standard hardened soybean oil with a melting point of 45° C. and the balance unhydrogenated rapeseed oils, for example, will have induction times on the order of 12 hours. Many commercial baking applications call for a shortening with a minimum R 120 induction period of 20 hours or longer, limiting the market acceptance of most blends. As noted above, embodiments of the invention have induction times of 20 hours or longer, with induction times of about 40 hours, e.g., about 50 hours, being achieved in some embodiments.

Another drawback of conventional FH+L blends is that their solid fat contents do not vary much with temperature. When manufacturing baked goods such as pastries, for example, it may be desirable to have a relatively low solid fat content, e.g., no greater than about 15 weight percent, at about 35-40° C. to avoid a greasy mouth feel when eaten. Typical FH+L blends with a SFC 20 of at least about 40 weight percent may include appreciable solid fats at 40° C., e.g., a FH+L blend with 40 weight percent fully hydrogenated soy fat may have a SFC 40 of 35 weight percent and a FH+L blend including about 60 weight percent fully hydrogenated soy fat may have a SFC 40 of 50 weight percent or more. Fats in some embodiments of the present invention having a SFC 20 of about 40, however, have a SFC 40 of about 10 weight percent or less.

The ratio of unsaturated cis-C18:y fatty acids (i.e., C18:1, C18:2, and C18:3) to the corresponding trans-C18:y fatty acids in a partially hydrogenated oil is an indication of the trans-selectivity of the hydrogenation process. More particularly, a higher ratio of unsaturated cis-C18:y fatty acid content to trans-C18:y fatty acid content suggests a lower likelihood of trans isomerization of an adsorbed carbon-carbon double bond at the catalyst surface. Higher ratios of unsaturated cis-fatty acids to trans-fatty acids, therefore, are preferred for many edible fats.

As noted above, trans-fatty acids may impact cardiovascular health more deleteriously than saturated fats. Recent studies (e.g., Mensink, *Am. J. Clin. Nutr.* 2003; 77: 1146-55) also indicate that C16 (palmitic acid) may have a more negative effect than C18 (stearic acid) on the risk of coronary heart disease. Studies also suggest that C18 may even measurably reduce coronary heart disease because C18 seems to promote higher serum levels of HDL, so-called "good cholesterol." The ratio of saturated C18 fatty acids to trans-fatty acids in a partially hydrogenated fat, therefore, can suggest health-related aspects of the fat. A higher ratio of C18 to trans-fatty acid can be considered more desirable, at least as long as the C18 content is not unduly high. A number of edible oils, e.g., soybean oil and rapeseed oil, have C18 contents of 6 weight percent or less, e.g., about 4 weight percent or less, prior to hydrogenation. For example, one exemplary deodorized, bleached soybean oil has a C18 content of about 4 weight percent and one exemplary deodorized, bleached rapeseed oil contains about two weight percent C18. Hydrogenation tends to increase C18 levels and conventional processes can yield C18 levels of 7 weight percent or higher for fats having a SFC 20 of about 30 weight percent. Trans-fatty acid content also increases during hydrogenation, though, and conventional processes yield at least about 36 weight percent trans-fatty acid in such a fat. As a result, conventional partially hydrogenated fat typically has more trans-fatty acid than C18, yielding a ratio of C18 to trans-fatty acid less than one, most commonly 0.7 or less.

The ratio of unsaturated cis-C18:y fatty acids (i.e., C18:1, C18:2, and C18:3) to the corresponding trans-C18:y fatty acids in a partially hydrogenated oil is an indication of the trans-selectivity of the hydrogenation process. More particularly, a higher ratio of unsaturated cis-C18:y fatty acid content to trans-C18:y fatty acid content suggests a lower likelihood of trans isomerization of an adsorbed carbon-carbon double bond at the catalyst surface. Higher ratios of unsaturated cis-fatty acids to trans-fatty acids, therefore, are preferred in many edible fats.

One useful embodiment of the invention provides a partially hydrogenated edible fat (e.g., soy or rapeseed oil) that has a solid fat content of about 20-80 weight percent at about 20° C.; has a C18:3 content of about one weight percent or less, e.g., no greater than about 0.1 weight percent; and includes no more than about 20 weight percent, e.g., no more than about 15 weight percent, of trans-fatty acids. This fat may also have a ratio of unsaturated cis-C18:y fatty acids to trans-C18:y fatty acids (abbreviated below as CFA: TFA) of at least about two, with a ratio of about 3 or greater, e.g., about 4 or more, being desirable. One particular embodiment has a s CFA:TFA ratio of at least about 6. Typically, conventional partially hydrogenated edible soybean and rapeseed fats having similar rheology and C18:3 content will have CFA:TFA ratios of less than 2, with some being less than one.

Some applications, e.g., some frying fats, call for edible fats having a SFC 20 of at least about 50-80 weight percent, e.g., 60-80 weight percent. Embodiments of the invention having a SFC 20 in this range may have a trans-fatty acid content of 10 weight percent or less, e.g., no greater than about 8 weight percent, advantageously about 6 weight percent or less. Fats in these embodiments may also have a CFA:TFA ratio of at least about 4, preferably 6 or greater. Select embodiments have CFA TFA ratios of at least about 8. Some implementations of these embodiments may employ soybean oil, rapeseed oil, or sunflower oil. Hydrogenation tests of palm oil have yielded fats with a SFC 20 of about 60 weight percent and at least about 10 times as much CFA as TFA, with a CFA:TFA ratio of 12 or higher.

As noted previously, FH+L blends tend to be less stable than similar partially hydrogenated fats. Very high CFA:TFA ratios are commonly associated with FH+L blends, which typically have CFA:TFA ratios of at least about 15, often 25 or higher, for soybean and rapeseed fats, for example. Hence, the CFA:TFA ratio in select embodiments of the invention is no greater than about 13, e.g., about 10 or less.

Another embodiment of the invention provides a partially hydrogenated edible fat that has a SFC 20 of about 20-80 weight percent, desirably about 25-80 weight percent, and includes no more than about 20 weight percent, e.g., no more than about 15 weight percent, of trans-fatty acids. This fat may also have a ratio of saturated C18 to trans-C18:y fatty acid (abbreviated below as C18:TFA) of at least about two, e.g., about 2.5 or higher. In some embodiments of the invention, the C18:TFA ratio is at least about 4, e.g., 6 or greater. Some particular embodiments have a C18:TFA ratio of 8 or higher. This is in contrast to conventionally hydrogenated soybean and rapeseed fats with SFC 20 of 20-80 weight percent, which typically have a C18:TFA ratio of less than 1.5, with ratios of less than one being commonplace. For instance, Hydrogenation Example A (below) includes a conventionally hydrogenated soybean fat (sample S180) with SFC 20 of 26 weight percent and a C18:TFA ratio of about 0.15 (See Table A2 below). Conventional partially hydrogenated rapeseed fats with SFC 20 of at least 20 weight percent typically have C18:TFA ratios below 0.25. Sample R180 of Hydrogenation Example B (below), for instance, had a C18: TFA ratio of about 0.21 at a SFC 20 of 24 (See Table B2 below). Some useful implementations of this embodiment comprise partially hydrogenated soybean fat, partially hydrogenated rapeseed fat, or a partially hydrogenated blend of soybean and rapeseed fats. Other embodiments may employ other fats, e.g., partially hydrogenated sunflower oil, palmolein, palm oil, or corn oil. FH+L blends commonly have C18:TFA ratios of at least about 25 and may be 30 or higher. Such blends are generally considered less stable than partially hydrogenated oils. Hence, the C18:TFA ratio in select embodiments of the invention is no greater than about 10, with C18:TFA ratios of about 8 or less being useful for a number of applications.

The solid fat content is one of the most commonly specified parameters of a partially hydrogenated fat to be used either alone (e.g., as a shortening) or as a component of a fat composition (e.g., a component of margarine). As noted above, embodiments of the invention have a solid fat content at 20° C. (SFC 20) of about 20-80 weight percent, desirably about 30-70 weight percent. Increasing the solid fat content from the lower end of this range typically requires more thorough hydrogenation, which, in turn, can increase the trans-fatty acid content of most conventionally hydrogenated oils. Accordingly, a ratio of the solid fat content at a particular temperature to the trans-fatty acid content is indicative of the efficiency, from a TFA content perspective, of achieving a desired solid fat content. For example, a relatively high ratio of the SFC 20 to the TFA content suggests that a particular solid fat content target may be achieved while keeping the TFA content within acceptable levels. The same can be said of the solid fat content at other temperatures, e.g., the ratio of the SFC 30 to the TFA content (referred to below as SFC 30:TFA). Comparing these ratios at two different temperatures can be particularly instructive for defining the rheology of a low trans-fatty acid fat.

Embodiments of the present invention have a SFC 20:TFA, of at least about two, e.g., at least about 4, for partially hydrogenated fats having a SFC 20 of at least about 25. In select embodiments, particularly those including a higher solid fat content, e.g., greater than 40 weight percent solid fats at 20° C., the SFC 20:TFA ratio may be 5 or higher with select embodiments having a minimum SFC 20:TFA ratio of about 6. In some useful embodiments in the invention, the fat has a SFC 20 of between about 25 and about 40 weight percent and has a SFC 20:TFA ratio of at least about two, with select embodiments having a minimum SFC 20:TFA ratio of 3, s e.g., 4 or higher, optionally 5 or higher. In other embodiments of the invention in which the fat has a SFC 20 of about 40-60 weight percent, the SFC:TFA ratio is at least about 4, e.g., 5 or higher. These numbers are particularly well suited to partially hydrogenated soy fats and rapeseed fats, for example.

Further embodiments of the invention have a SFC 30:TFA ratio of at least about one, preferably two or higher, for a fat having a SFC 30 of at least about 10 weight percent. In select embodiments, the SFC 30:TFA ratio is at least about 2.5, e.g., 3 or higher, for a partially hydrogenated fat,. e.g., a partially hydrogenated soy fat or rapeseed fat, having a SFC 30 of about 10-45 weight percent.

The fatty acid profiles of fats of the invention will depend to a significant extent on the nature of the oil being hydrogenated. The following will summarize some exemplary embodiments of the invention using specific starting oils. In each of these particular embodiments, the partially hydrogenated fat has a solid fat content of about 20-80 weight percent at about 20° C.

Soybean Oil: The partially hydrogenated fat in one exemplary embodiment of the invention comprises. a partially hydrogenated soy fat with a TFA content of about 20 weight percent or less, e.g., 4-20 weight percent, preferably no more than about 15 weight percent, e.g., about 5-10 weight percent. In one implementation of this embodiment, the partially hydrogenated soy fat has a SFC 20 of about 25-60 weight percent and a SFC 20:TFA ratio greater than two, preferably about 4 or higher, e.g., 5 or higher, and optionally at least about 6. In another implementation, a partially hydrogenated soy fat having a SFC 30 of about 10-45 may have a SFC 30:TFA ratio of at least one, desirably about two or higher, e.g., 2.5 or higher and optionally 3 or higher. Another adaptation of this embodiment provides a soy fat that has been partially hydrogenated to have a SFC 20 of at least about 25 weight percent such that the ratio of the absolute value of the decrease in Iodine Value to the trans-fatty acid content on a weight percent basis (dIV:TFA) is at least about 5, e.g., 7.5 or higher, with select embodiments having a dIV:TFA ratio of about 9 or higher. In another implementation of this embodiment, the CFA:TFA ratio is at least about two, e.g., 3 or higher. In select implementations, this ratio is at least about 4, e.g., 5 or higher. In some embodiments, the CFA:TFA ratio may also be no greater than about 13, e.g., about 10 or less. In another implementation, the C18:TFA ratio is at least about one, e.g., at least about two, with select embodiments having a C18:TFA ratio of 3 or greater, e.g., about 4 or greater. If so desired, the C18:TFA ratio may also be no greater than about 10, e.g., 8 or less. Embodiments having a R 120 induction period of at least about 25 hours, preferably about 40 hours or longer, may be particularly utile, e.g., as a frying fat or bakery shortening.

In one embodiment, a soybean fat has a SFC 20 of about 40-80 weight percent, e.g., about 60-80 weight percent; a TFA content of 10 weight percent or less, e.g., no greater than about 8 weight percent, advantageously about 7 weight percent or less; a SFC 20:TFA ratio of at least about 4, e.g., 6 or higher, and optionally at least about 7 or 8; a SFC 30:TFA ratio of at least about 3, e.g., 4 or higher, and optionally at least about 5; a dIV:TFA value of at least about 6, e.g., 8 or higher, and optionally at least about 10; and a CFA:TFA ratio of at least about 3, preferably 4 or greater Rapeseed Oil: Another exemplary embodiment of the invention provides a partially hydrogenated rapeseed fat with a TFA content of about 20 weight percent or less, e.g., about 4-20 weight percent, preferably no more than about 15 weight percent, e.g., about 5-10 weight percent. In one implementation of this embodiment, the partially hydrogenated rapeseed fat has a SFC 20 of about 25-60 weight percent and a SFC 20 TFA ratio of at least about 3, e.g., at least about 4 and optionally about 6 or greater. One other adaptation of the embodiment provides a partially hydrogenated rapeseed fat with a SFC 30 of about 10-45 weight percent and a SFC 30:TFA ratio of at least about two, e.g., at least about 2.5, with select embodiments having a SFC 30:TFA ratio of 5 or greater. In another adaptation of this embodiment, the partially hydrogenated rapeseed fat has a SFC 20 of about 25-60 and a dIV:TFA of at least about 4, e.g., 5 or higher, with select embodiments having a dIV:TFA ratio of at least about 8, e.g., 10 or higher. The CFA:TFA ratio is at least about 3, e.g., 4 or higher. In select implementations, this ratio is at least about 5, with CFA:TFA ratios of 7 or higher deemed particularly useful. If so desired, the CFA:TFA ratio may also be no greater than about 15, e.g., about 12 or less. In another implementation, the C18:TFA ratio is at least about one, e.g., at least about two, with select embodiments having a C18:TFA ratio of 3 or greater, e.g., 4 or greater. If so desired, the C18:TFA ratio may also be no greater than about 15, e.g., about 10 or less. Embodiments having a R 120 induction period of at least about 25 hours, preferably about 40 hours or longer may be particularly utile, e.g., as a frying shortening.

In one embodiment, a rapeseed fat has a SFC 20 of about 40-80 weight percent, e.g., about 60-80 weight percent; a TFA content of 10 weight percent or less, e.g., no greater than about 8 weight percent, advantageously about 6 weight percent or less; a SFC 20:TFA ratio of at least about 4, e.g., 6 or higher, and optionally at least about 8 or 10; a SFC 30:TFA ratio of at least about 3, e.g., 5 or higher, and optionally at least about 7; a dIV:TFA value of at least about 6, e.g., 8 or higher, and optionally at least about 10; and a CFA:TFA ratio of at least about 3, e.g., 4 or higher, and optionally at least about 5 or 6.

Sunflower Oil: Partially hydrogenated sunflower fat in accordance with some embodiments of the invention have fatty acid profiles that depend on whether the oil is a "conventional" or "high-oleic" variety. As used herein, a conventional sunflower oil has a C18:1 (oleic acid) content less than 77 weight percent prior to hydrogenation; high-oleic sunflower oil has a C18:1 content of at least about 77 weight percent prior to hydrogenation. A sunflower fat made by partially hydrogenating a conventional sunflower oil may have a TFA content of about 4-20 weight percent, preferably no more than about 15 weight percent, e.g., about 5-10 weight percent. In an alternative embodiment that employs a high-oleic sunflower oil, the resultant partially hydrogenated sunflower fat has a TFA content of about 4-15 weight percent, e.g., no more than about 10 weight percent. The partially hydrogenated sunflower fat may have a SFC 20 of about 20-80 weight percent and a SFC 20:TFA ratio of at least about three and it may also have a SFC 30 of about 10-45 weight percent and a SFC 30:TFA ratio of at least about two. In another adaptation, the partially hydrogenated sunflower fat bas a SFC 20 of about 20-80 weight percent and a dIV:TFA ratio of at least about 5, e.g., about 8 or higher, with select embodiments having a dIV:TFA ratio of 10 or higher. The CFA:TFA ratio may be at least about 4, e.g., 5 or higher, and may optionally be no greater than about 20, e.g., no more than about 15. In another aspect, a partially hydrogenated sunflower fat in accordance with an embodiment of the invention may have a C18: TFA ratio and is at least about one, e.g., at least about two, with some particular implementations having a C18:TFA ratio of 3 or greater. If so desired, the C18: TFA ratio may also be no greater than about 20, e.g., about 15 or less. Some embodiments of the invention also provide a partially hydrogenated sunflower fat that has a R 120 induction period of 25 hours or longer, e.g., at least about 40 hours.

One embodiment provides a sunflower fat having a SFC 20 of about 40-80 weight percent, e.g., about 60-80 weight percent; a TFA content of 15 weight percent or less, e.g., no greater than about 10 weight percent; a SFC 20:TFA ratio of at least about 4, e.g., 6 or higher, and optionally at least about 8 or 10; a SFC 30:TFA ratio of at least about 3, e.g., 4 or higher, and optionally at least about 5 or 6; a dIV:TFA value of at least about 6, e.g., 8 or higher, and optionally at least about 10; and a CFA:TFA ratio of at least about 3, e.g., 4 or higher.

Palmolein: A partially hydrogenated palmolein fat in other embodiments of the invention has SFC 20 of 40 weight percent or more and contains no more than about 10 weight percent, e.g., no more than about 5 weight percent frans-fatty acids. In one implementation of this embodiment, The SFC 20:TFA ratio is at least about 4, e.g., 8 or higher, and preferably at least about 10. Other embodiments provide partially hydrogenated palmolein fat with a SFC 20 of 40 weight percent or more and a dIV:TFA ratio of at least about two, e.g., 4 or higher. The CFA:TFA ratio may be at least about two and, optionally, no greater than about 15. The C18:TFA ratio of a partially hydrogenated palmolein fat in another embodiment is at least about two, e.g., 3 or higher, and may optionally be no greater than about 20, e.g., about 15 or less. Other embodiments of the invention provide a partially hydrogenated palmolein fat with a R 120 induction period of at least about 25 hours, e.g., 40 hours or longer. Hydrogenation tests of palmolein and palm oil have yielded fats with a SFC 20 of about 60 weight percent and at least about 10 times as much CFA as TFA, with CFA:TFA ratios at a SFC 20 of about 60 weight percent averaging 12 or higher. Select embodiments of the invention comprise partially hydrogenated palmolein with a SFC 20 of about 40-80 weight percent, e.g., about 60-80 weight percent, and having a CFA:TFA ratio of at least about 6, e.g. 8 or higher; CFA:TFA ratios of 8-20, e.g., about 10-15, may be useful for some applications.

In one embodiment, a palm fat, which may be derived from palmolein or palm oil, has a SFC 20 of about 40-80 weight percent, e.g., about 60-80 weight percent; a TFA content of 10 weight percent or less, e.g., no greater than about 8 weight percent, and optionally about 6 weight percent or less; a SFC 20:TFA ratio of at least about 4, e.g., 6 or higher, and optionally at least about 8 or 10; a SFC 30:TFA ratio of at least about 3, e.g., 4 or higher, preferably at least about 5 and optionally no less than about 6 or 8; a dIV:TFA value of at least about 6, e.g., 8 or higher, and optionally at least about 10; and a CFA:TFA ratio of at least about 3, e.g., 4or higher.

Palm Oil: A further embodiment of the invention provides a partially hydrogenated palm oil fat having a SFC 20 of at least about 40 weight percent and contains no more than about 10 weight percent, e.g., 5 weight percent or less, trans-fatty acids. In one particular implementation, the palm fat has a SFC 20 of at least about 50 weight percent and a SFC 20:TFA ratio of at least about 6, e.g., about 10 or higher. The dIV:TFA ratio may be at least about one, preferably two or higher, with dIV:TFA ratios of at least about 3 being preferred for many applications. The partially hydrogenated palm fat may have a CFA:TFA ratio of at least about 3 and, optionally, may be no greater than about 20. In some implementations, the C18: TFA ratio may be at least about two, e.g., 3 or higher, and optionally no greater than about 20, e.g., about 15 or less. Palm fats in some embodiments of the invention may have a R 120 induction period of 25 hours or longer, e.g., at least about 40 hours. Select embodiments of the invention comprise partially hydrogenated palm fat with a SFC 20 of about 40-80 weight percent, e.g., about 60-80 weight percent, and having a CFA:TFA ratio of at least about 6, e.g. 8 or higher; CFA:TFA ratios of 8-20, e.g., about 10-15 may be useful for some applications.

Corn Oil: Still another embodiment of the invention provides a partially hydrogenated corn fat with a SFC 20 of 20-80 weight percent and containing no more than about 20 weight percent, preferably no more than about 15 weight percent, of trans-fatty acids.

The following examples illustrate aspects of select hydrogenation processes and edible hydrogenated fats in the context of hydrogenating refined seed oils:

Hydrogenation Example A—Soybean Oil

About 15 metric tons of neutralized, bleached soybean oil was charged into a commercial hydrogenation reactor, heated to about 45° C., and flushed with hydrogen. About 120 kg (0.8 weight percent) of commercial PRICAT 9920 catalyst prepared in a fashion substantially similar to the fourth exemplary catalyst composition mentioned above was mixed with the soybean oil to form a slurry. The slurry was hydrogenated at about 50-60° C. with an iodine value drop of about 10 per hour (as approximated by the rate of hydrogen gas uptake) at a pressure of about 20 bar. Samples quantities were taken periodically at times estimated to yield a hydrogenated fat having a SFC 20 at a target weight percent, e.g., 10, 25, 45, and 70 weight percent.

This process was repeated for a second batch of neutralized, bleached 5 soybean oil, but with a couple of variations. In particular, the second batch included about 30 kg (0.2 weight percent, versus about 0.8 weight percent) of the same catalyst composition and was hydrogenated at a temperature of about 72-90° C. (versus about 50-60° C.).

For purposes of comparison, a third batch of neutralized, bleached soybean oil was hydrogenated in a more conventional fashion. This batch included about 0.08 weight percent of commercial PRICAT 9910 and was hydrogenated at about 180° C. and a pressure of about 3 bar-a at an iodine value drop of about 20 per hour.

Tables A1-A4 list select physical properties and aspects of the fatty acid profile of the soybean oil at selected points during the course of hydrogenation, with the data under the heading S180 corresponding to the conventional hydrogenation at 180° C., the data under the heading S50 corresponding to the 50° C. hydrogenation, and the data under the heading S72 corresponding to the 72° C. hydrogenation. In these tables, the melting temperature of the hydrogenated oil is stated either as a "Slip Melting Point" determined in accordance with ISO 6321 or as a Mettler Drop Point (MDP) determined in accordance with AOCS Cc 18-80.

TABLE A1

Target SFC 20 of about 10 wt. %

|  | S180 | S50 | S72 |
|---|---|---|---|
| Iodine Value | 93 | 94 | 85 |
| Slip Melting Point (° C.) | 25 | — | — |
| MDP (° C.) | — | 34 | 29 |
| Solid Fat Content |  |  |  |
| SFC 10 (wt. %) | 21 | 14 | 16 |
| SFC 20 (wt. %) | 8 | 7 | 7 |
| SFC 30 (wt. %) | 2 | 3 | 2 |
| SFC 40 (wt. %) | 0 | 0 | 0 |
| Fatty Acid Profile |  |  |  |
| C 16 (wt. %) | 12 | 11 | 11 |
| C 18 (wt. %) | 5 | 13 | 12 |
| C 18:1 Total (wt. %) | 58 | 42 | 54 |
| C 18:2 Total (wt. %) | 23 | 32 | 21 |
| C 18:3 Total (wt. %) | 1 | 1 | 0 |
| TFA (wt. %) | 22 | 5 | 10 |
| CFA (wt. %) | 60 | 70 | 65 |
| CFA:TFA | 2.73 | 14 | 6.5 |
| C18:TFA | 0.23 | 2.6 | 1.2 |
| SFC 20:TFA | 0.36 | 1.4 | 0.70 |
| SFC 30:TFA | 0.09 | 0.60 | 0.20 |
| dIV:TFA | 1.9 | 8.2 | 5.0 |

TABLE A2

Target SFC 20 of about 25 wt. %

|  | S180 | S50 | S72 |
|---|---|---|---|
| Iodine Value | 81 | 69 | 63 |
| Slip Melting Point (° C.) | 30 | — | — |
| MDP (° C.) | — | 43 | 41 |
| Solid Fat Content |  |  |  |
| SFC 10 (wt. %) | 53 | 40 | 44 |
| SFC 20 (wt. %) | 26 | 25 | 25 |
| SFC 30 (wt. %) | 5 | 13 | 11 |
| SFC 40 (wt. %) | 0 | 5 | 3 |
| Fatty Acid Profile |  |  |  |
| C 16 (wt. %) | 11 | 12 | 11 |
| C 18 (wt. %) | 5 | 23 | 21 |
| C 18:1 Total (wt. %) | 72 | 50 | 61 |
| C 18:2 Total (wt. %) | 10 | 15 | 6 |
| C 18:3 Total (wt. %) | 1 | 0 | 0 |
| TFA (wt. %) | 34 | 7 | 13 |
| CFA (wt. %) | 49 | 58 | 54 |
| CFA:TFA | 1.4 | 8.3 | 4.2 |
| C18:TFA | 0.15 | 3.3 | 1.6 |
| SFC 20:TFA | 0.76 | 3.6 | 1.9 |
| SFC 30:TFA | 0.15 | 1.9 | 0.85 |
| dIV:TFA | 1.6 | 9.4 | 5.5 |

TABLE A3

Target SFC 20 of about 40 wt. %

|  | S180 | S50 | S72 |
|---|---|---|---|
| Iodine Value | 72 | 55 | 57 |
| Slip Melting Point (° C.) | 35 | — | — |
| MDP (° C.) | — | 49 | 48 |
| Solid Fat Content |  |  |  |
| SFC 10 (wt. %) | 68 | 59 | 62 |
| SFC 20 (wt. %) | 42 | 42 | 42 |
| SFC 30 (wt. %) | 15 | 26 | 24 |
| SFC 40 (wt. %) | 0 | 11 | 10 |

TABLE A3-continued

Target SFC 20 of about 40 wt. %

|  | S180 | S50 | S72 |
|---|---|---|---|
| Fatty Acid Profile |  |  |  |
| C 16 (wt. %) | 11 | 11 | 11 |
| C 18 (wt. %) | 8 | 31 | 28 |
| C 18:1 Total (wt. %) | 77 | 50 | 57 |
| C 18:2 Total (wt. %) | 3 | 7 | 3 |
| C 18:3 Total (wt. %) | 0 | 0 | 0 |
| TFA (wt. %) | 45 | 8 | 14 |
| CFA (wt. %) | 35 | 49 | 46 |
| CFA:TFA | 0.78 | 6.1 | 3.3 |
| C18:TFA | 0.17 | 3.3 | 2.0 |
| SFC 20:TFA | 0.93 | 5.3 | 3.0 |
| SFC 30:TFA | 0.33 | 3.3 | 1.7 |
| dIV:TFA | 1.4 | 10 | 6.4 |

TABLE A4

Target SFC 20 of about 60 wt. %

|  | S180 | S50 | S72 |
|---|---|---|---|
| Iodine Value | 62 | 46 | 46 |
| Slip Melting Point (° C.) | 42 | — | — |
| MDP (° C.) | — | 52 | 49 |
| Solid Fat Content |  |  |  |
| SFC 10 (wt. %) | 86 | 70 | 75 |
| SFC 20 (wt. %) | 69 | 60 | 58 |
| SFC 30 (wt. %) | 38 | 42 | 37 |
| SFC 40 (wt. %) | 9 | 24 | 16 |
| Fatty Acid Profile |  |  |  |
| C 16 (wt. %) | 12 | 11 | 11 |
| C 18 (wt. %) | 19 | 39 | 34 |
| C 18:1 Total (wt. %) | 66 | 45 | 53 |
| C 18:2 Total (wt. %) | 3 | 4 | 2 |
| C 18:3 Total (wt. %) | 0 | 0 | 0 |
| TFA (wt. %) | 39 | 9 | 14 |
| CFA (wt. %) | 30 | 40 | 41 |
| CFA:TFA | 0.77 | 4.4 | 2.9 |
| C18:TFA | 0.49 | 4.3 | 2.4 |
| SFC 20:TFA | 1.8 | 6.7 | 4.1 |
| SFC 30:TFA | 0.97 | 4.7 | 2.6 |
| dIV:TFA | 1.9 | 9.9 | 6.4 |

Figure 3:
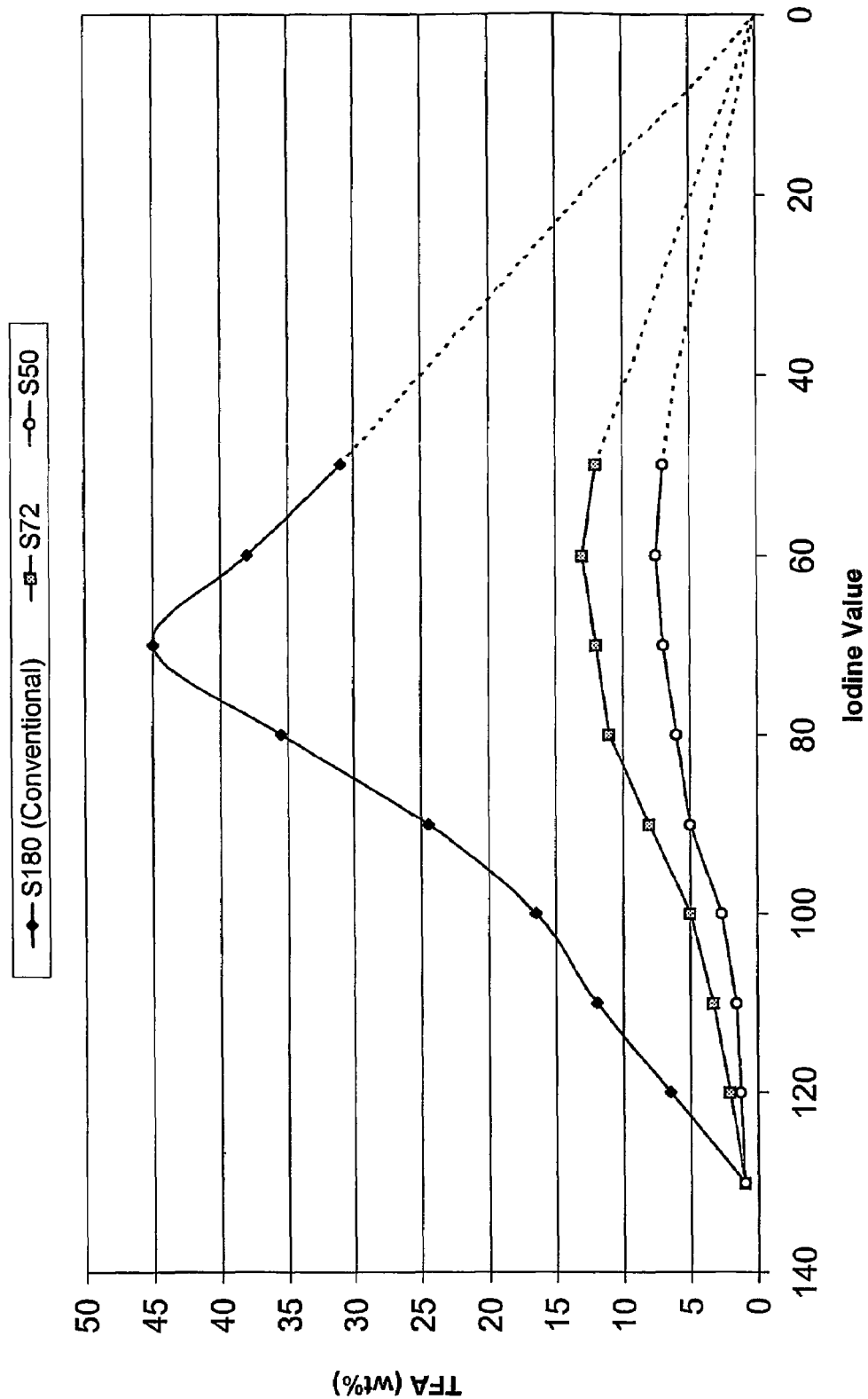
FIG. 3 is a graph illustrating variation of trans-fatty acid content as a function of Iodine Value for a soybean oil that is partially hydrogenated in accordance with a conventional hydrogenation process or in accordance with embodiments of the invention.

FIG. 3 is a plot of variation of the trans-fatty acid content with the Iodine Value for each of these three batches (S180, S50, and S72). This figure graphically highlights the remarkable difference in trans-fatty acid content of conventionally hydrogenated soybean oil and the soybean oil hydrogenated in accordance with embodiments of the invention. The trans-fatty acid content of the conventionally hydrogenated oil increases quite rapidly from an initial value of nearly 0 weight percent to greater than 40 weight percent. Neither of the batches hydrogenated with a catalyst composition in accordance with embodiments of the invention exceeded 14 weight percent trans-fatty acid, less than a third of the maximum for the conventionally hydrogenated product. The S50 batch had a maximum trans-fatty acid content of about 9 weight percent, about one fifth that of the conventional S180 batch.

A partially hydrogenated soybean fat in accordance with one embodiment of the invention has a solid fat content at 20° C. of at least about 20 weight percent (e.g., about 20-80 weight percent) and a trans-fatty acid content of no greater than about 15 weight percent, more desirably no greater than about 10 weight percent. Both the S50 and the S72 batches have trans-fatty acid content of less than 15 weight percent throughout the measured range of Iodine Values. Likely because of its lower hydrogenation temperature, the S50 batch maintains an even lower trans-fatty acid content, with a maximum of 7 weight percent. As discussed above, hydrogenation in select embodiments is conducted at a temperature no greater than about 80° C., e.g., 50° C. or less. FIG. 3 demonstrates that the S50 batch consistently maintained a trans-fatty acid content below that of the S72 batch.

The S50 batch also demonstrates that embodiments of the invention can reduce the Iodine Value of an oil by more than 65 (from 135 to 69 in Table A2) in an industrial setting while increasing the trans-fatty acid content by no more than about 7 weight percent. In particular, the ratio of the absolute value of the decrease in Iodine Value to the increase in trans-fatty acid content on a weight percent basis (dIV:TFA in Tables A1-A4) is between 9 and 10 for this particular experimental example. Although this ratio varies somewhat over the course of hydrogenation, FIG. 3 illustrates that the ratio starts out quite high then remains generally between about 9 and about 11 over the course of the measured Iodine Values. The dIV:TFA ratio for the S72 batch remains at 5 or higher over the range of measured values, but the conventionally hydrogenated S180 never exceeded about two over the same range. Since the change in Iodine Value correlates to the degree of hydrogenation, a higher dIV:TFA ratio is desirable in that less trans-fatty acid is present at the same degree of hydrogenation. In one embodiment of the invention, the dIV:TFA ratio is at least about 5, e.g., about 7 or greater, for partially hydrogenated fats having a SFC 20 of about 20-80 weight percent; such a fat having a dIV:TFA ratio of at least about 9 is expected to be useful for many applications.

Hydrogenation Example B—Rapeseed Oil

About 15 metric tons of neutralized, bleached, deodorized rapeseed oil was charged into a commercial hydrogenation reactor, heated to about 45° C., and flushed with hydrogen. About 60 kg (about 0.4 weight percent) of a commercial PRICAT 9920 catalyst prepared substantially similar to the fourth exemplary catalyst composition mentioned above was mixed with the rapeseed oil to form a slurry. The slurry was hydrogenated at about 45° C. with an Iodine Value drop of about 10 per hour at a pressure of about 20 bar. Samples were taken periodically at times estimated to yield a hydrogenated fat having a SFC 20 at target weight percents of 10, 20, 35, and 55 weight percent. This process was repeated for a second batch of neutralized, bleached, deodorized rapeseed oil, but the second batch included about 15 kg (0.1 weight percent versus about 0.4 weight percent) of the same catalyst composition and was hydrogenated at a temperature of about 72° C. (versus about 45° C.). A third batch of neutralized, bleached, deodorized rapeseed oil was hydrogenated in a more conventional fashion. This batch included about 0.12 weight percent of commercial PRICAT 9910 and was hydrogenated at about 180° C. and a pressure of about 4 bar-a at an Iodine Value drop of about 20 per hour.

Tables B1-B4 list certain physical properties and aspects of the fatty acid profile of the rapeseed oil at selected points during the course of hydrogenation, with the data under the heading R180 corresponding to the conventional hydrogenation, the data under the heading R45 corresponding to the 45° C. hydrogenation, and the data under the heading R72 corresponding to the 72° C. hydrogenation:

TABLE B1

Target SFC 20 of about 20–25 wt. %

|  | R180 | R45 | R72 |
|---|---|---|---|
| Iodine Value | 77 | 65 | 67 |
| Slip Melting Point (° C.) | 28 | — | — |
| MDP (° C.) | — | 41 | 31 |
| Solid Fat Content |  |  |  |
| SFC 10 (wt. %) | 47 | 33 | 37 |
| SFC 20 (wt. %) | 24 | 21 | 21 |
| SFC 30 (wt. %) | 5 | 10 | 10 |
| SFC 40 (wt. %) | 0 | 3 | 3 |
| Fatty Acid Profile |  |  |  |
| C 16 (wt. %) | 5 | 5 | 6 |
| C 18 (wt. %) | 8 | 23 | 22 |
| C 18:1 Total (wt. %) | 77 | 62 | 65 |
| C 18:2 Total (wt. %) | 6 | 6 | 4 |
| C 18:3 Total (wt. %) | 0 | 0 | 0 |
| TFA (wt. %) | 38 | 5 | 9 |
| CFA (wt. %) | 45 | 63 | 60 |
| CFA:TFA | 1.2 | 12.6 | 6.7 |
| C18:TFA | 0.21 | 4.6 | 2.4 |
| SFC 20:TFA | 0.63 | 4.2 | 2.3 |
| SFC 30:TFA | 0.13 | 2.0 | 1.1 |
| dIV:TFA | 0.74 | 8.0 | 4.2 |

TABLE B2

Target SFC 20 of about 30–35 wt. %

|  | R180 | R45 | R72* |
|---|---|---|---|
| Iodine Value | 74 | 60 | 60 |
| Slip Melting Point (° C.) | 32 | — | — |
| MDP (° C.) | — | 44 | 37 |
| Solid Fat Content |  |  |  |
| SFC 10 (wt. %) | 58 | 44 | 51 |
| SFC 20 (wt. %) | 35 | 30 | 34 |
| SFC 30 (wt. %) | 11 | 17 | 18 |
| SFC 40 (wt. %) | 0 | 7 | 6 |
| Fatty Acid Profile |  |  |  |
| C 16 (wt. %) | 5 | 5 | 5 |
| C 18 (wt. %) | 11 | 29 | 29 |
| C 18:1 Total (wt. %) | 76 | 58 | 60 |
| C 18:2 Total (wt. %) | 5 | 5 | 2 |
| C 18:3 Total (wt. %) | 0 | 0 | 0 |
| TFA (wt. %) | 50 | 6 | 10 |
| CFA (wt. %) | 31 | 57 | 52 |
| CFA:TFA | 0.62 | 8.5 | 5.2 |
| C18:TFA | 0.22 | 4.8 | 2.9 |
| SFC 20:TFA | 0.70 | 5.0 | 3.4 |
| SFC 30:TFA | 0.22 | 2.8 | 1.8 |
| dIV:TFA | 0.62 | 7.5 | 4.5 |

TABLE B3

Target SFC 20 of about 55–60 wt. %

|  | R180 | R45* | R72 |
|---|---|---|---|
| Iodine Value | 65 | 43 | 51 |
| Slip Melting Point (° C.) | 37 | — | — |
| MDP (° C.) | — | 52 | 46 |
| Solid Fat Content |  |  |  |
| SFC 10 (wt. %) | 82 | 69 | 73 |
| SFC 20 (wt. %) | 57 | 60 | 54 |
| SFC 30 (wt. %) | 24 | 42 | 35 |
| SFC 40 (wt. %) | 4 | 24 | 16 |

TABLE B3-continued

Target SFC 20 of about 55–60 wt. %

|  | R180 | R45* | R72 |
|---|---|---|---|
| Fatty Acid Profile |  |  |  |
| C 16 (wt. %) | 5 | 6 | 6 |
| C 18 (wt. %) | 16 | 44 | 38 |
| C 18:1 Total (wt. %) | 73 | 46 | 52 |
| C 18:2 Total (wt. %) | 1 | 1 | 1 |
| C 18:3 Total (wt. %) | 0 | 0 | 0 |
| TFA (wt. %) | 47 | 6 | 11 |
| CFA (wt. %) | 27 | 41 | 42 |
| CFA:TFA | 0.57 | 6.8 | 3.8 |
| C18:TFA | 0.34 | 7.3 | 3.5 |
| SFC 20:TFA | 1.2 | 10 | 4.9 |
| SFC 30:TFA | 0.51 | 7.0 | 3.2 |
| dIV:TFA | 0.85 | 10 | 4.9 |

TABLE B4

Target SFC 20 of about 70–75 wt. %

|  | R180 | R45* | R72 |
|---|---|---|---|
| Iodine Value | 59 |  | 45 |
| Slip Melting Point (° C.) | 43 | — | — |
| MDP (° C.) | — | — | 49 |
| Solid Fat Content |  |  |  |
| SFC 10 (wt. %) | 94 |  | 79 |
| SFC 20 (wt. %) | 77 |  | 68 |
| SFC 30 (wt. %) | 47 |  | 49 |
| SFC 40 (wt. %) | 14 |  | 27 |
| Fatty Acid Profile |  |  |  |
| C 16 (wt. %) | 5 |  | 6 |
| C 18 (wt. %) | 24 |  | 44 |
| C 18:1 Total (wt. %) | 66 |  | 46 |
| C 18:2 Total (wt. %) | 1 |  | 1 |
| C 18:3 Total (wt. %) | 0 |  | 0 |
| TFA (wt. %) | 45 |  | 12 |
| CFA (wt. %) | 22 |  | 35 |
| CFA:TFA | 0.49 |  | 2.9 |
| C18:TFA | 0.53 |  | 3.7 |
| SFC 20:TFA | 1.7 |  | 5.7 |
| SFC 30:TFA | 1.0 |  | 4.1 |
| dIV:TFA | 1.0 |  | 5.0 |

Figure 4:
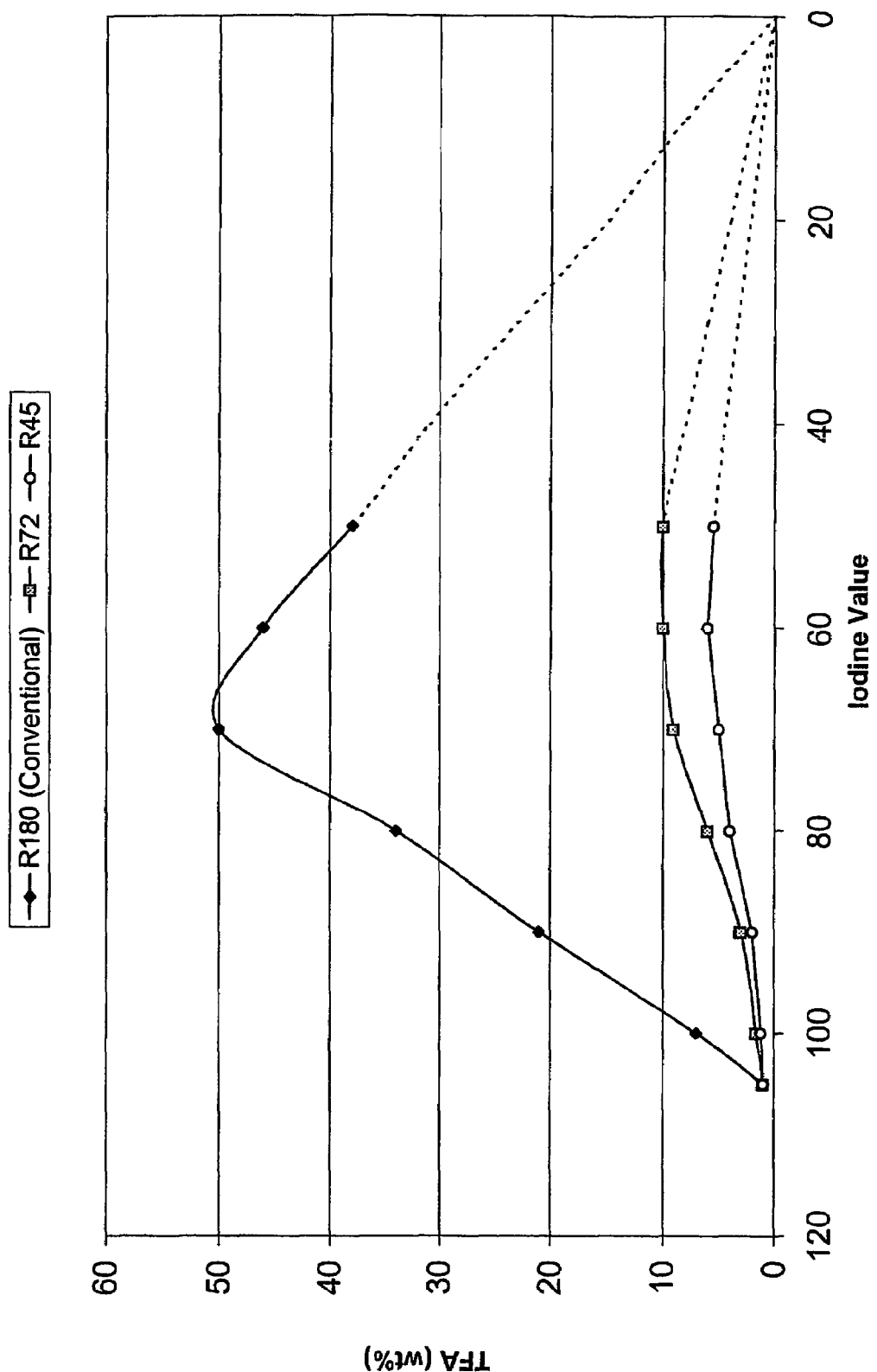
FIG. 4 is a graph illustrating variation of trans-fatty acid content as a function of Iodine Value for a rapeseed oil that is partially hydrogenated in accordance with a conventional hydrogenation process or in accordance with embodiments of the invention.

The trans-fatty acid content is plotted against Iodine Value for each of these three batches (R180, R45, and R72) in FIG. 4. As in the preceding example employing soybean oil, the difference between the conventional hydrogenation and hydrogenation in accordance with embodiments of the invention is striking. The conventionally hydrogenated oil shoots up rapidly from an initial trans-fatty acid content of about 1 weight percent to more than 50 weight percent, i.e., more than half of the fatty acid profile is trans-fatty acid. Over this period, the dIV:TFA ratio remains below 1. After reaching a high of over 50 weight percent trans-fatty acid, the trans-fatty acid content drops as continued hydrogenation converts some of the trans-fatty acids into saturated fatty acids. In contrast, FIG. 4 illustrates how the dIV:TFA ratio for the R45 batch starts relatively high and remains between about 8 and about 11 over the rest of the range of measured values. The dIV:TFA ratio for the R72 batch remains between about 4 and about 6 over much of the range of measured values. The sharply higher dIV:TFA ratios for the R45 and R72 batches indicate that much less trans-fatty acid was produced for a given degree of hydrogenation than in conventional rapeseed oil hydrogenation.

Both the R45 and R72 batches had a maximum trans-fatty acid content of well under 15 weight percent over the measured range, with the R72 batch remaining no greater than about 10 weight percent trans-fatty acid for an Iodine Value change of almost 50 (from 105 to 60) even with a starting oil containing about 1 weight percent trans-fatty acid. Of particular note, the R45 sample did not exceed 6 weight percent trans-fatty acid at any point over the measured range, suggesting that the hydrogenation process never generated more than 5 weight percent trans-fatty acid. This is a full order of magnitude less than the peak trans-fatty acid content of the conventionally hydrogenated sample.

These examples suggest that aspects of the low-temperature hydrogenation processes outlined above can be used beneficially for a variety of products. In the context of edible fats, for example, embodiments of the invention provide products that often have trans-fatty acid contents less than 15, e.g., no more than about 10, which can be less than half, and as little as 10%, of the trans-fatty acid content produced in a more conventional process. In addition, the ratio of cis- to trans-C18:y acids in embodiments of the invention is often at least about double the same ratio for a more conventionally processed product. Both of these factors suggest that embodiments of the invention have a more desirable trans selectivity than conventional processes. Further embodiments of the invention also yield partially hydrogenated edible fats having a ratio of saturated C18 to trans-fatty acids at least about double, and commonly 5-10 times, that of analogous conventionally hydrogenated products.

E. Edible, Partially Hydrogenated Fat Compositions

Further embodiments of the invention contemplate fat compositions that may incorporate partially hydrogenated fats such as those discussed in Section D. As noted above, the hydrogenated fats may be at least semi-solid at about 20-25° C., with a SFC 20 of about 20-80 weight percent, preferably about 25-75 weight percent, and a trans-fatty acid content of no greater than about 20 weight percent, e.g., 4-20 weight percent, preferably no greater than about 15 weight percent, e.g., 5-10 weight percent. Such fats may be used in a wide variety of fat compositions, including but not limited to frying fats, margarines, shortenings, bakery fats, cream filling fats, choco spreads, powdered fats, and animal feeds. These applications are well known in the art and often involve the modification of the fats of the present invention by blending with other fats, oils, flavors, emulsifiers, texturizers, and the like. In one general embodiment, the invention comprises any food product that incorporates a partially hydrogenated fat in accordance any of the previously-discussed embodiments.

One embodiment of the invention provides a shortening composition that includes a partially hydrogenated shortening fat having a SFC 20 of about 20-80 weight percent and a trans-fatty acid content of no more than about 20 weight percent, e.g., about 4-20 weight percent, and preferably no more than about 15 weight percent, e.g., about 5-10 weight percent. This shortening fat may comprise one of the fats outlined above, e.g., a partially hydrogenated soy fat or rapeseed fat in accordance with the embodiments outlined in Section D above. The shortening composition may also include a variety of other ingredients commonly employed in edible shortenings and may be blended with those ingredients in known processes. For example, the shortening fat may comprise a partially hydrogenated fat as noted above and another fat, e.g., a food oil, a partially hydrogenated food oil, or a fully hardened food oil. The shortening composition may employ any of a variety of known antioxidant systems, e.g., tocopherol, TBHQ, BHT, or propyl gallate. It may also include metal scavengers such as citric acid and EDTA to increase the stability of the shortening composition. The shortening composition may also be blended with one or more conventional shortening emulsifiers, typically by physical blending. These emulsifiers include, for example, lecithin, diacetylated tartaric acid esters of monoglycerides, and sodium stearoyl lactylate.

Another embodiment of the invention provides a margarine or spread composition that includes a margarine fat in accordance with an embodiment of the invention. Such a margarine fat desirably has a SFC 20 of about 20-80 weight percent and a trans-fatty acid content of no more than about 20 weight percent, preferably about 4-15 weight percent, e.g., about 5-10 weight percent. If so desired, the margarine fat may also include a structuring fat. Such structuring fats are well known in the art and may include, for example, lauric fats, e.g., palm oil, palmolein, coconut oil, a stearin fraction of such an oil, or interesterified mixtures of such oils. The margarine fat may, in addition to or instead of the structuring fat, include a hardstock fat, such as a fully hardened edible oil. The margarine or spread composition may include the margarine fat and a dispersed aqueous phase and have a plastic rheology. The margarine or spread composition may also include minor amounts of other additives, e.g., antioxidants such as those noted above, emulsifiers such as those noted above, vitamins, colorants, or flavorants. The aqueous phase may include any of a variety of conventional compositions, e.g., any one or more of water, salt, milk components (e.g., soured milk or buttermilk), flavor preservatives, and food acids.

The following examples are intended to demonstrate the use of the products of the present invention. They are illustrative and not intended to limit the scope of the invention in any way.

Shortening Composition

Shortenings tend to have a high fat content. Some shortenings include varying amounts of emulsifiers, flavors, coloring, and ant-oxidants, but other shortenings consist essentially of fat. Shortenings in select embodiments of the invention comprise a low-trans fat having a SFC 20 of at least about 20 weight percent, preferably at least about 40 weight percent, formed of any edible oil or fat, e.g., a seed or vegetable oil such as soybean oil, rapeseed oil, sunflower oil, palm oil, palm oil fractions, or blends thereof.

In one test, a general purpose bakery shortening was made using a partially hydrogenated soybean oil produced in a low-temperature process generally as outlined above. Partially hydrogenated soybean oil S50 from Table A3, which had an SFC 20 of about 42 weight percent, was blended with soybean oil. The blend was produced by mixing about 85 weight percent of the partially hydrogenated fat with about 15 weight percent of the soybean oil in a buffer tank. The temperature setting on the buffer tank was about 60° C. The buffer tank was connected to an Armfield FT 25 BBPA surface scraped heat exchanger (SSHE) in the combination AABC with the following settings:

|  | Settings |
| --- | --- |
| Pump (%) | 50 |
| Pressure (bar) | 12 |
| A-unit (rpm) | 400 |
| B-unit (rpm) | 100 |
| Set T-out (° C.) | 16 |

The resultant shortening had acceptable plasticity. To test stability, the shortening was stored at about 20° C. and evaluated after about 1 week of storage and again after about 4 weeks of storage. In each test, the shortening had retained its plasticity and exhibited no significant post hardening.

Margarine Composition

Margarines generally comprise a fat phase and an aqueous phase that is predominantly water. Margarines intended as a table spread typically are made with pourable oils instead of harder fats. Some types of industrial margarines have a higher solid fat content, though. For example, pastry margarines often have SFC 20 values in the range of 30-50 weight percent and SFC 40 values of about 5-10 weight percent. Margarines in some embodiments of the invention may have an SFC 20 of at least about 30 weight percent, e.g., 30-50 weight percent, and include about 75-85 weight percent of a low-trans fat of the invention having an SFC 20 of at least about 30 and about 15-20 weight percent water. The balance of the margarine may comprise suitable amounts of salt, emulsifiers (e.g., lecithin), antioxidants, flavorings, colors, etc.

In one example, a pastry margarine was formed from a partially hydrogenated palm fat produced generally as discussed above to yield a SFC 20 of about 39 weight percent. The composition of the margarine was:

|  | Composition (%) |
| --- | --- |
| FAT PHASE | |
| Partially hydrogenated palm fat | 80.7 |
| Lecithin, Dimodan, β carotene, and flavorings. | 0.2 |
| WATER PHASE | |
| Water | 18.0 |
| NaCl | 1.0 |
| Sorbic and/or citric acid | 0.1 |

The fat phase was mixed in a buffer tank. The water phase was blended separately heated to about 60° C., after which the pH was buffered with Citric acid to a pH of about 4. The water phase was added to the fat phase in the buffer tank set at about 65° C. The phases were mixed well to form a pre-emulsion of water in fat with the same type of Armfield SSHE, and in the same configuration, as in the preceding example, but employing the following settings:

|  | Settings |
| --- | --- |
| Pump (%) | 50 |
| Pressure (bar) | 12 |
| A-unit (rpm) | 750 |
| B-unit (rpm) | 100 |
| Set T-out (° C.) | 14 |

The margarine had good plasticity. Storage and testing as in the preceding example demonstrated that this margarine retained good plasticity for at least 4 weeks with no significant post-hardening.

Frying Fat

Frying fats in accordance with further embodiments of the invention may comprise, in very large part, a low-trans fat having a SFC 20 of at least about 20 weight percent, preferably at least about 40 weight percent. As in both of the previous examples, the fat source may be similar to the two preceding embodiments, i.e., any edible oil or fat, e.g., a seed or vegetable oil such as soybean oil, rapeseed oil, sunflower oil, palm oil, palm oil fractions, or blends thereof.

One experimental composition was formed using a partially hydrogenated soybean oil similar to that used in the shortenings example above, having an SFC 20 of about 42 weight percent. This was stirred in a buffer tank with a temperature set at about 65° C. The buffer tank was connected to the same type of Armfield SSHE as in the previous examples operated in the same configuration but with the following settings:.

|  | Settings |
| --- | --- |
| Pump (%) | 65 |
| Pressure (bar) | 8 |
| A-unit (rpm) | 400 |
| B-unit (rpm) | 100 |
| Set T-out (° C.) | 14 |

The consistency and recrystallization of the fat was tested after one week and 4 weeks of storage at 20° C. The fat retained a good consistency and appearance and it exhibited no significant post-hardening over this time.

In addition, products of the present invention can be used in the preparation of other oil products through modification such as fractionation, interesterification, used in the preparation of mono or di-glycerides, or in any manner that traditionally hydrogenated fats and oils are used.

The above-detailed embodiments and examples are intended to be illustrative, not exhaustive, and those skilled in the art will recognize that various equivalent modifications are possible within the scope of the invention. For example, whereas steps are presented in a given order, alternative embodiments may perform steps in a different order. The various embodiments described herein can be combined to provide further embodiments.

In general, the terms used in the following claims should not be construed to limit the invention to the specific embodiments disclosed in the specification unless the preceding description explicitly defines such terms. The inventors reserve the right to add additional claims after filing the application to pursue additional claim forms for other aspects of the invention.

The invention claimed is:

1. A method of partially hydrogenating an unsaturated fat, comprising:
    dispersing a nickel-based catalyst in an unsaturated edible oil, the edible oil having an initial Iodine Value and an initial fatty acid profile;
    delivering hydrogen to the oil; and
    hydrogenating the oil at a hydrogenation temperature no greater than about 75° C. for a hydrogenation time to yield a partially hydrogenated fat having a modified Iodine Value and including a modified fatty acid profile, wherein the partially hydrogenated fat has a solid fat content of about 25-80 weight percent at 20° C., an absolute difference between the initial Iodine Value and the modified Iodine Value (dIV) divided by the hydrogenation time defines an average Iodine Value change rate of no less than about 5/hour, and no more than about 15 weight percent of the modified fatty acid profile comprises trans-fatty acids.

2. The method of claim 1 wherein the oil is at the hydrogenation temperature when initiating the hydrogenation and the oil is hydrogenated without adding external heat.

3. The method of claim 1 wherein hydrogen is delivered to the oil before dispersing the nickel-based catalyst in the oil.

4. The method of claim 1 wherein the hydrogenation temperature is no greater than about 60° C.

5. The method of claim 1 wherein the hydrogenation temperature is no greater than about 50° C.

6. The method of claim 1 wherein the hydrogenation temperature changes over the course of the hydrogenation time, the hydrogenation reaction being initiated at a hydrogenation temperature no greater than about 60° C.

7. The method of claim 1 wherein the average Iodine Value change rate is between about 6/hour and about 40/hour.

8. The method of claim 1 wherein delivering hydrogen to the oil comprises delivering a gas consisting essentially of hydrogen.

9. The method of claim 1 wherein a total trans-fatty acid increase is a difference between the weight percent of the trans-fatty acids in the modified fatty acid profile and an initial trans-fatty acid weight percent of the initial fatty acid profile, wherein the ratio of dIV to the trans-fatty acid increase is at least about 5.

10. An edible fat composition comprising:
    a partially hydrogenated fat having
        a solid fat content of about 20-80 weight percent at 20° C.;
        a trans-fatty acid content of no greater than about 15 weight percent of a fatty acid profile; and
        an average Iodine Value change rate of no less than about 5/hour, wherein the average Iodine Value change rate is defined by the absolute difference between an initial Iodine Value of the fat prior to hydrogenation and a modified Iodine Value of the fat following hydrogenation divided by a hydrogenation time.

11. A method of hydrogenating an edible oil having an initial solid fat content of less than 20 weight percent at 20° C., an initial Iodine Value, and an initial fatty acid profile, the method comprising:
    providing a catalyst composition including a fat component and a nickel-based catalyst that has been heated to a first temperature;
    dispersing the catalyst composition in the oil;
    delivering hydrogen to the oil; and
    hydrogenating the oil at a second temperature to yield a partially hydrogenated fat having a modified Iodine Value and including a modified fatty acid profile, wherein:
        the second temperature is less than the first temperature;
        dispersing the catalyst composition comprises contacting the oil with the catalyst composition, the catalyst composition being at a third temperature, the third temperature less than the first temperature and at least as great as a melting point of the fat composition;
        the partially hydrogenated fat has a solid fat content of about 20-80 weight percent at 20° C.;
        an absolute difference between the initial Iodine Value and the modified Iodine Value (dIV) divided by the hydrogenation time defines an average Iodine Value change rate of about 6-40/hour; and
        no more than about 15 weight percent of the modified fatty acid profile comprises trans-fatty acids.

12. The method of claim 11 wherein dispersing the catalyst composition comprises contacting the catalyst composition, which is at a third temperature, with the oil, the third temperature being greater than the second temperature and at least as great as a melting point of the fat composition.

13. The edible fat composition of claim 10 wherein the solid fat content is about 25-80 weight percent at 20° C., and wherein the average Iodine Value change rate is about 6-40/hour.

14. A partially hydrogenated fat selected from a group consisting of partially hydrogenated soybean oil and partially hydrogenated rapeseed oil, the partially hydrogenated fat having:
- a solid fat content of at least about 20 weight percent at 20° C.;
- a trans-fatty acid content of about 4-20 weight percent of the fatty acid profile; and
- a ratio of C18 content to the trans-fatty acid content (C18:TFA) of at least about one.

15. The partially hydrogenated fat of claim 14 wherein the trans-fatty acid content is no greater than about 10 weight percent.

16. The partially hydrogenated fat of claim 14 wherein the trans-fatty acid content is no greater than about 8 weight percent.

17. The partially hydrogenated fat of claim 14 wherein the C18:TFA ratio is at least about two.

18. The partially hydrogenated fat of claim 14 wherein the C18:TFA ratio is at least about 4.

19. The partially hydrogenated fat of claim 14 wherein a ratio of the solid fat content at 20° C. to the trans-fatty acid content is at least about two.

20. The partially hydrogenated fat of claim 14 wherein a ratio of the solid fat content at 20° C. to the trans-fatty acid content is at least about 4.

21. The partially hydrogenated fat of claim 14 wherein the partially hydrogenated oil had an initial Iodine Value prior to hydrogenation and the partially hydrogenated fat has a final Iodine Value, a ratio of the absolute value of a difference between the initial and final Iodine Values to the trans-fatty acid content is at least about 4.

22. A partially hydrogenated fat selected from a group consisting of partially hydrogenated soybean oil and partially hydrogenated rapeseed oil, the partially hydrogenated fat having:
- a solid fat content of about 20-80 weight percent at 20° C.;
- a trans-fatty acid content of no greater than about 15 weight percent of the fatty acid profile; and
- a ratio of the solid fat content at 20° C. to the trans-fatty acid content (SFC 20:TFA) of at least about two.

23. The partially hydrogenated fat of claim 22 wherein the trans-fatty acid content is no greater than about 10 weight percent.

24. The partially hydrogenated fat of claim 22 wherein the trans-fatty acid content is no greater than about 8 weight percent.

25. The partially hydrogenated fat of claim 22 wherein the SFC 20:TFA ratio is at least about 4.

26. The partially hydrogenated fat of claim 22 wherein the SFC 20:TFA ratio is at least about 6.

27. The partially hydrogenated fat of claim 22 wherein a ratio of a cis-fatty acid content to the trans-fatty acid content is at least about 3.

28. The partially hydrogenated fat of claim 22 wherein a ratio of C18 content to the trans-fatty acid content is at least about two.

29. The partially hydrogenated fat of claim 22 wherein a ratio of C18 content to the trans-fatty acid content is at least about 4.

30. The partially hydrogenated fat of claim 14 wherein the solid fat content at 20° C. is about 40-80 weight percent.

31. The partially hydrogenated fat of claim 30 wherein a ratio of the solid fat content at 20° C. to the trans-fatty acid content is at least about 6.

32. The partially hydrogenated fat of claim 30 wherein a ratio of the solid fat content at 30° C. to the trans-fatty acid content is at least about 3.

33. The partially hydrogenated fat of claim 30 wherein a ratio of a cis-fatty acid content to the trans-fatty acid content is at least about 3.

34. A partially hydrogenated fat selected from a group consisting of partially hydrogenated soybean oil, partially hydrogenated rapeseed oil, and partially hydrogenated sunflower oil, the partially hydrogenated fat having a fatty acid profile in which:
- a solid fat content is about 40-80 weight percent at 20° C.;
- a trans-fatty acid content is no greater than about 15 weight percent; and
- a ratio of C18 content to the trans-fatty acid content (C18:TFA) is at least about two.

35. A partially hydrogenated palm fat having a fatty acid profile in which:
- a solid fat content is about 40-80 weight percent at 20° C.;
- a trans-fatty acid content is no greater than about 10 weight percent; and
- a ratio of the solid fat content at 20° C. to the trans-fatty acid content (SFC 20:TFA) is at least about 4.

36. A food product comprising the fat of claim 14.

37. A frying fat composition comprising the fat of claim 14.

38. A shortening composition comprising the fat of claim 14.

39. The shortening composition of claim 38 wherein the fat has a solid fat content at 20° C. of at least about 40 weight percent, further comprising a liquid oil blended with the fat.

40. A margarine composition comprising water and the fat of claim 14.

* * * * *

UNITED STATES PATENT AND TRADEMARK OFFICE
CERTIFICATE OF CORRECTION

PATENT NO. : 7,498,453 B2
APPLICATION NO. : 10/567726
DATED : March 3, 2009
INVENTOR(S) : Van Toor et al.

It is certified that error appears in the above-identified patent and that said Letters Patent is hereby corrected as shown below:

On title page, item (73), in column 1, in "Assignee", line 1, delete "Cargill" and insert -- Cargill, --, therefor.

On page 2, in column 2, under "Other Publications", line 1, delete "Edfible" and insert -- Edible --, therefor.

On page 2, in column 2, under "Other Publications", line 15, delete "Wissenchaft" and insert -- Wissenschaft --, therefor.

On page 3, in column 1, under "Other Publications", line 2, delete "Wissenchaft" and insert -- Wissenschaft --, therefor.

On page 3, in column 1, under "Other Publications", line 51, delete "Ing." and insert -- Ind. --, therefor.

On page 3, in column 2, under "Other Publications", line 6, delete "JOACS," and insert -- JAOCS, --, therefor.

On page 3, in column 2, under "Other Publications", line 11, delete "JOACS," and insert -- JAOCS, --, therefor.

On page 3, in column 2, under "Other Publications", line 30, delete "JOACS," and insert -- JAOCS, --, therefor.

On page 3, in column 2, under "Other Publications", line 35, delete "Silicia" and insert -- Silica --, therefor.

On page 3, in column 2, under "Other Publications", line 47, delete "ofVegatable" and insert -- of Vegetable --, therefor.

On page 3, in column 2, under "Other Publications", line 60, delete "et a.," and insert -- et al., --, therefor.

On page 3, in column 2, under "Other Publications", line 61, delete "Equiped" and insert -- Equipped --, therefor.

On page 4, in column 1, under "Other Publications", line 2, delete "fo" and insert -- for --, therefor.

UNITED STATES PATENT AND TRADEMARK OFFICE
CERTIFICATE OF CORRECTION

PATENT NO. : 7,498,453 B2
APPLICATION NO. : 10/567726
DATED : March 3, 2009
INVENTOR(S) : Van Toor et al.

It is certified that error appears in the above-identified patent and that said Letters Patent is hereby corrected as shown below:

In column 1, line 9, delete "and a" and insert -- which is a --, therefor.

In column 3, line 11, delete "soy bean" and insert -- soybean --, therefor.

In column 3, line 19, delete "soy bean" and insert -- soybean --, therefor.

In column 3, line 24, delete "(SFC 20: TFA)" and insert -- (SFC 20:TFA) --, therefor.

In column 7, line 15, delete "150°," and insert -- 150° C,, --, therefor.

In column 14, line 34, delete "system. 100" and insert -- system 100 --, therefor.

In column 17, line 57, delete "CFA: TFA)" and insert -- CFA:TFA) --, therefor.

In column 17, line 60, before "CFA:TFA" delete "s".

In column 18, line 5, delete "CFA TFA" and insert -- CFA:TFA --, therefor.

In column 18, line 45-51, after "corn oil." delete "FH+L blends....number of applications." and insert the same on Col. 18, Line 46, as a new paragraph.

In column 18, line 57, delete "20-80weight" and insert -- 20-80 weight --, therefor.

In column 19, line 18, delete "3, s" and insert -- 3, --, therefor.

In column 19, line 28, delete "fat,." and insert -- fat, --, therefor.

In column 19, line 40, delete "comprises." and insert -- comprises --, therefor.

In column 20, line 13, after "greater" insert -- . --.

In column 20, line 20-21, delete "SFC 20 TFA" and insert -- SFC 20:TFA --, therefor.

In column 21, line 7, delete "bas" and insert -- has --, therefor.

In column 21, line 34, delete "frans-fatty" and insert -- trans-fatty --, therefor.

In column 21, line 67, delete "4or" and insert -- 4 or --, therefor.

UNITED STATES PATENT AND TRADEMARK OFFICE
CERTIFICATE OF CORRECTION

PATENT NO. : 7,498,453 B2
APPLICATION NO. : 10/567726
DATED : March 3, 2009
INVENTOR(S) : Van Toor et al.

It is certified that error appears in the above-identified patent and that said Letters Patent is hereby corrected as shown below:

In column 22, line 48, before "soybean" delete "5".

In column 28, line 46, delete "emulisifers," and insert -- emulsifiers, --, therefor.

In column 31, line 12, delete "settings:." and insert -- settings: --, therefor.

In column 32, line 23, in claim 9, delete "dIV" and insert -- (dIV) --, therefor.

Signed and Sealed this

Fifteenth Day of September, 2009

David J. Kappos
*Director of the United States Patent and Trademark Office*